US011334610B2

(12) United States Patent
Shazeer et al.

(10) Patent No.: US 11,334,610 B2
(45) Date of Patent: May 17, 2022

(54) PROVIDING RELEVANCE-ORDERED CATEGORIES OF INFORMATION

(71) Applicant: Google LLC, Mountain View, CA (US)

(72) Inventors: Yael Shacham Shazeer, Palo Alto, CA (US); Leland Rechis, Brooklyn, NY (US); Scott Jenson, Palo Alto, CA (US); Gabriel Wolosin, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 77 days.

(21) Appl. No.: 17/005,713

(22) Filed: Aug. 28, 2020

(65) Prior Publication Data

US 2020/0394210 A1     Dec. 17, 2020

Related U.S. Application Data

(63) Continuation of application No. 13/164,550, filed on Jun. 20, 2011, now Pat. No. 10,783,177, which is a continuation of application No. 11/624,175, filed on Jan. 17, 2007, now Pat. No. 7,966,309.

(51) Int. Cl.
*G06F 16/33* (2019.01)
*G06F 16/338* (2019.01)
*G06F 16/951* (2019.01)
*G06F 16/35* (2019.01)

(52) U.S. Cl.
CPC ............ *G06F 16/338* (2019.01); *G06F 16/35* (2019.01); *G06F 16/951* (2019.01)

(58) Field of Classification Search
CPC ....... G06F 16/338; G06F 16/951; G06F 16/35
See application file for complete search history.

(56) References Cited

U.S. PATENT DOCUMENTS

| 5,263,157 A | 11/1993 | Janis |
| 5,375,125 A | 12/1994 | Oshima et al. |
| 5,826,261 A | 10/1998 | Spencer |
| 5,949,413 A | 9/1999 | Lerissa et al. |
| 5,983,220 A | 11/1999 | Schmitt |
| 5,983,221 A | 11/1999 | Christy |

(Continued)

FOREIGN PATENT DOCUMENTS

| EP | 0 918 295 | 5/1999 |
| EP | 1 288 626 | 3/2003 |

(Continued)

OTHER PUBLICATIONS

European Office Action in European Application No. 08713811.1 dated Jan. 18, 2012, 8 pages.

(Continued)

*Primary Examiner* — Eliyah S. Harper
(74) *Attorney, Agent, or Firm* — Dority & Manning, P.A.

(57) ABSTRACT

A computer-implemented method is disclosed. The method includes receiving from a remote device a search query, generating a plurality of different category-directed result sets for the search query, determining an order for the plurality of category-directed result sets based on the search query, and transmitting the plurality of category-directed result sets to the remote device, in a manner that the result sets are to be displayed in the remote device in the determined order.

20 Claims, 11 Drawing Sheets

(56) References Cited

U.S. PATENT DOCUMENTS

| | | |
|---|---|---|
| 5,987,460 A | 11/1999 | Niwa et al. |
| 6,023,708 A | 2/2000 | Mendez et al. |
| 6,324,544 B1 | 11/2001 | Alam et al. |
| 6,356,905 B1 | 3/2002 | Gershman et al. |
| 6,370,527 B1 | 4/2002 | Singhal |
| 6,393,423 B1 | 5/2002 | Goedken |
| 6,484,162 B1 | 11/2002 | Edlund et al. |
| 6,610,105 B1 | 8/2003 | Martin, Jr. et al. |
| 6,636,853 B1 | 10/2003 | Stephens, Jr. |
| 6,715,131 B2 | 3/2004 | Martin, Jr. et al. |
| 6,738,766 B2 | 5/2004 | Peng |
| 6,769,130 B1 | 7/2004 | Getsin et al. |
| 6,816,944 B2 | 11/2004 | Peng |
| 6,832,355 B1 | 12/2004 | Duperrouzel et al. |
| 6,941,383 B1 | 9/2005 | Getsin et al. |
| 6,944,621 B1 | 9/2005 | Collart |
| 6,944,661 B2 | 9/2005 | Moore et al. |
| 6,961,731 B2 | 11/2005 | Holbrook |
| 6,996,798 B2 | 2/2006 | Ali et al. |
| 7,043,521 B2 | 5/2006 | Eitel |
| 7,043,685 B2 | 5/2006 | Azuma |
| 7,047,499 B2 | 5/2006 | Ferri |
| 7,054,870 B2 | 5/2006 | Holbrook |
| 7,117,239 B1 | 10/2006 | Hansen |
| 7,149,792 B1 | 12/2006 | Hansen et al. |
| 7,162,473 B2 | 1/2007 | Dumais et al. |
| 7,162,494 B2 | 1/2007 | Arellano |
| 7,165,105 B2 | 1/2007 | Reiner et al. |
| 7,178,106 B2 | 2/2007 | Lamkin et al. |
| 7,178,149 B2 | 2/2007 | Hansen |
| 7,181,488 B2 | 2/2007 | Martin et al. |
| 7,185,014 B1 | 2/2007 | Hansen |
| 7,188,193 B1 | 3/2007 | Getsin et al. |
| 7,219,139 B2 | 5/2007 | Martin et al. |
| 7,228,493 B2 | 6/2007 | Kosak et al. |
| 7,251,687 B1 | 7/2007 | McCullough |
| 7,269,634 B2 | 9/2007 | Getsin et al. |
| 7,281,042 B2 | 10/2007 | Hsu et al. |
| 7,287,251 B1 | 10/2007 | Mensching et al. |
| 7,290,223 B2 | 10/2007 | Decombe |
| 7,318,056 B2 | 1/2008 | Taniguchi et al. |
| 7,346,843 B2 | 3/2008 | Hind et al. |
| 7,346,920 B2 | 3/2008 | Lamkin et al. |
| 7,373,244 B2 | 5/2008 | Kreft |
| 7,376,640 B1 | 5/2008 | Anderson et al. |
| 7,379,661 B2 | 5/2008 | Lamkin et al. |
| 7,392,481 B2 | 6/2008 | Gewickey et al. |
| 7,444,319 B1 | 10/2008 | Sathyanarayan |
| 7,448,021 B1 | 11/2008 | Lamkin et al. |
| 7,454,515 B2 | 11/2008 | Lamkin et al. |
| 7,458,091 B1 | 11/2008 | Getsin et al. |
| 7,487,499 B2 | 2/2009 | Gatz |
| 7,493,315 B2 | 2/2009 | Holbrook |
| 7,499,938 B2 | 3/2009 | Collart |
| 7,505,992 B2 | 3/2009 | Collart |
| 7,536,408 B2 | 5/2009 | Patterson |
| 7,555,476 B2 | 6/2009 | Holbrook |
| 7,567,959 B2 | 7/2009 | Patterson |
| 7,577,677 B2 | 8/2009 | Collart |
| 7,580,921 B2 | 8/2009 | Patterson |
| 7,580,929 B2 | 8/2009 | Patterson |
| 7,584,175 B2 | 9/2009 | Patterson |
| 7,584,223 B1 | 9/2009 | Pinkas et al. |
| 7,585,223 B2 | 9/2009 | Iddings et al. |
| 7,587,486 B2 | 9/2009 | Taniguchi |
| 7,599,914 B2 | 10/2009 | Patterson |
| 7,603,345 B2 | 10/2009 | Patterson |
| 7,617,164 B2 | 11/2009 | Burges et al. |
| 7,624,103 B2 | 11/2009 | Wiegering et al. |
| 7,630,972 B2 | 12/2009 | Ott et al. |
| 7,650,342 B2 | 1/2010 | Sugiyama et al. |
| 7,676,505 B2 | 3/2010 | Chess et al. |
| 7,689,510 B2 | 3/2010 | Lamkin et al. |
| 7,689,615 B2 | 3/2010 | Burges et al. |
| 7,693,863 B2 | 4/2010 | Martin et al. |
| 7,702,618 B1 | 4/2010 | Patterson |
| 7,711,679 B2 | 5/2010 | Patterson |
| 7,711,795 B2 | 5/2010 | Getsin et al. |
| 7,716,158 B2 | 5/2010 | McConnell |
| 7,725,453 B1 | 5/2010 | Chen et al. |
| 7,743,046 B2 | 6/2010 | Anand et al. |
| 7,752,195 B1 | 7/2010 | Hohwald et al. |
| 7,756,890 B2 | 7/2010 | Carter |
| 7,765,206 B2 | 7/2010 | Hills et al. |
| 7,966,309 B2 | 6/2011 | Shacham et al. |
| 7,966,321 B2 | 6/2011 | Wolosin et al. |
| 8,005,822 B2 | 8/2011 | Rechis et al. |
| 8,046,375 B2 | 10/2011 | Quince |
| 8,086,604 B2 | 12/2011 | Arrouye et al. |
| 8,489,591 B2 | 7/2013 | Wolosin et al. |
| 10,783,177 B2 | 9/2020 | Shacham et al. |
| 2002/0103787 A1 | 8/2002 | Goel Surendra et al. |
| 2002/0112237 A1 | 8/2002 | Kelts |
| 2004/0015409 A1* | 1/2004 | Chittenden ........ G06Q 30/0601 705/26.1 |
| 2004/0054549 A1* | 3/2004 | Chittenden ............ G01C 21/20 705/338 |
| 2004/0162830 A1 | 8/2004 | Shirwadkar et al. |
| 2005/0027408 A1* | 2/2005 | Donoghue ......... H04N 21/4312 701/11 |
| 2005/0065774 A1 | 3/2005 | Doganata et al. |
| 2005/0071328 A1 | 3/2005 | Lawrence |
| 2005/0125447 A1 | 6/2005 | Cragun et al. |
| 2005/0192705 A1* | 9/2005 | Pinney ...................... G07F 9/02 700/241 |
| 2005/0240576 A1 | 10/2005 | Piscitello et al. |
| 2005/0240580 A1 | 10/2005 | Zamier |
| 2006/0069664 A1 | 3/2006 | Ling et al. |
| 2006/0098670 A1* | 5/2006 | Voit .................... H04L 43/0888 370/401 |
| 2006/0129907 A1 | 6/2006 | Volk et al. |
| 2006/0149734 A1 | 7/2006 | Egnor |
| 2006/0161535 A1 | 7/2006 | Holbrook |
| 2006/0184512 A1 | 8/2006 | Kohanim et al. |
| 2006/0187200 A1 | 8/2006 | Martin et al. |
| 2006/0248061 A1 | 11/2006 | Kulakow et al. |
| 2006/0271520 A1 | 11/2006 | Ragan |
| 2006/0279775 A1 | 12/2006 | Matsumoto et al. |
| 2007/0042800 A1 | 2/2007 | Tani |
| 2007/0050335 A1 | 3/2007 | Kashima et al. |
| 2007/0061301 A1 | 3/2007 | Ramer et al. |
| 2007/0118533 A1 | 5/2007 | Ramer et al. |
| 2007/0130091 A1 | 6/2007 | Cordery et al. |
| 2008/0071738 A1 | 3/2008 | Hoeber et al. |
| 2008/0109740 A1* | 5/2008 | Prinsen ................. G06F 3/0486 715/764 |
| 2008/0172357 A1 | 7/2008 | Rechis et al. |
| 2008/0172362 A1 | 7/2008 | Shacham et al. |
| 2008/0172374 A1 | 7/2008 | Wolosin et al. |
| 2008/0215557 A1 | 9/2008 | Ramer et al. |
| 2010/0287049 A1 | 11/2010 | Rousso et al. |
| 2011/0264654 A1 | 10/2011 | Wolosin et al. |
| 2011/0320488 A1 | 12/2011 | Rechis et al. |

FOREIGN PATENT DOCUMENTS

| | | |
|---|---|---|
| EP | 1 420 550 | 5/2004 |
| EP | 1 555 625 | 7/2005 |
| JP | H10-257100 | 9/1998 |
| JP | 2002-269129 | 9/2002 |
| JP | 2003-099456 | 4/2003 |
| JP | 2003-196286 | 7/2003 |
| JP | 2003-242169 | 8/2003 |
| JP | 2004-348511 | 12/2004 |
| JP | 2004-355075 | 12/2004 |
| JP | 2009-500954 | 1/2009 |
| KR | 1020030066064 | 8/2003 |
| KR | 1020060104031 | 10/2006 |
| WO | WO 00/41090 | 7/2000 |
| WO | WO 02/41190 | 5/2002 |
| WO | WO 03/079229 | 9/2003 |
| WO | WO 04/099916 | 11/2004 |
| WO | WO 05/066831 | 7/2005 |

(56) References Cited

FOREIGN PATENT DOCUMENTS

| WO | WO 05/066844 | 7/2005 |
|---|---|---|
| WO | WO 2006/061270 | 6/2006 |
| WO | WO 07/005945 | 1/2007 |

OTHER PUBLICATIONS

European Search Report issued in EP 08713814.5 dated Nov. 24, 2010, 3 pages. (dated as Nov. 4, 2010, correct date is Nov. 24, 2010).
International Preliminary Report on Patentability for Application No. PCT/US2008/051339, dated Jul. 30, 2009, 8 pages.
Communication Pursuant to Art. 94(3) for EP Application No. 08713800, dated Jun. 12, 2012, 5 pages.
European Search Report for EP Application No. 08713800, dated May 23, 2012, 3 pages.
Japanese Official Action for Application No. 2009-546514, dated Oct. 23, 2012, 7 pages.
International Preliminary Report on Patentability for Application No. PCT/US2008/051361, dated Jul. 30, 2009, 7 pages.
Japanese Official Action for Application No. JP 2009-546516, dated drafted Jul. 31, 2012, mailing dated Aug. 7, 2012, 6 pages.
International Preliminary Report on Patentability for Application No. PCT/US2008/051354, dated Jul. 30, 2009, 9 pages.
Hattori, S., et al., "Activity-Based Query Refinement for Context-Aware Information Retrieval", ICADL 2006, LNCS 4312, pp. 474-477, 2006.
Hattori, S., et al., "Context-Aware Query Refinement for Mobile Web Search", Proceedings of the 2007 International Symposium on Applications and the Internet Workshops (SAINTW'07), 2007, pp. 1-4.
International Search Report & Written Opinion, PCT/US2008/051339, dated May 26, 2008, 12 pages.
International Search Report & Written Opinion, PCT/US2008/051354, dated Jul. 2, 2008, 15 page.
International Search Report & Written Opinion, PCT/US2008/051361, dated May 26, 2008, 11 pages.
Japanese Office Action in Japanese Application No. 2009-546516, dated Jun. 11, 2013, 3 pages.
Jones et al., Sorting out Searching on Small Screen Devices, 2002, 15 pages.
Kajmo and Florio, "Domino R5: Domain Search," IBM [online] Mar. 1, 1999, [retrieved on Jan. 6, 2014] Retrieved from the Internet <URL: http://www.ibm.com/developerworks/lotus/library/ls-Domain_Search/>, 12 pages.
Lee Wang, et al. "Detecting Dominant locations from search queries," SIGIR '05: Proceedings of The 28th Annual Int'l ACM SIGIR Conference on Research and Development in Information Retrieval, [Online] Aug. 19, 2005, pp. 424-431 Salvador, Brazil, Aug. 15 19, 2005.
Machine Translation of Korean Patent Documents KR 10-2006-0104031 (10 pages).
O'Brien, "The New Domino R5 Directory Catalog: An Administrator's Guide," The View, 4(6):3-20, 18 pages Nov./Dec. 1998.
Office Action in Australian Application No. 2008206127, dated Oct. 17, 2011, 2 pages.
Office Action in Canadian Application No. 2,675,858, dated Aug. 27, 2013, 3 pages.
Office Action in Chinese Application No. 200880008570.8, dated Feb. 29, 2012, 3 pages [English translation only].
USPTO Final Office Action in U.S. Appl. No. 11/624,175, dated Apr. 8, 2009, 24 pages.
USPTO Final Office Action in U.S. Appl. No. 11/624,175, dated Jun. 11, 2010, 36 pages.
USPTO Final Office Action in U.S. Appl. No. 11/624,184, dated Jun. 1, 2010, 15 pages.
USPTO Final Office Action in U.S. Appl. No. 11/624,191, dated Apr. 9, 2009, 20 pages.
USPTO Final Office Action in U.S. Appl. No. 11/624,191, dated May 3, 2010, 37 pages.
USPTO Final Office Action in U.S. Appl. No. 13/214,737, dated Aug. 9, 2012, 19 pages.
USPTO Final Office Action in U.S. Appl. No. 13/214,737, dated Sep. 4, 2013, 18 pages.
USPTO Non-final Office Action in U.S. Appl. No. 11/624,175, dated Dec. 4, 2009, 38 pages.
USPTO Non-final Office Action in U.S. Appl. No. 11/624,175, dated Oct. 31, 2008, 21 pages.
USPTO Non-final Office Action in U.S. Appl. No. 11/624,184, dated Jan. 22, 2009, 22 pages.
USPTO Non-final Office Action in U.S. Appl. No. 11/624,184, dated Nov. 25, 2009, 15 pages.
USPTO Non-final Office Action in U.S. Appl. No. 11/624,191, dated Oct. 31, 2008, 20 pages.
USPTO Non-final Office Action in U.S. Appl. No. 11/624,191, dated Oct. 23, 2009, 29 pages.
USPTO Non-final Office Action in U.S. Appl. No. 13/214,737, dated Dec. 14, 2011, 23 pages.
USPTO Non-final Office Action in U.S. Appl. No. 13/214,737, dated Dec. 14, 2012, 21 pages.
Australian Office Action in Australian Application No. 2012216475, dated Feb. 21, 2014, 3 pages.
Office Action issued in Indian Application No. 1418/MUMNP/2009 dated Nov. 2, 2015, 2 pages.
Office Action issued in Indian Application No. 1417/MUMNP/2009 dated Jan. 25, 2016, 2 pages.
Summons to Attend Oral Proceedings with Annex issued in European Application No. 08713800.4, dated Nov. 7, 2017, 12 pages.
Zhuang et al. "Re-ranking search results using query logs," International Conference on Information and Knowledge Management, Proceedings of the 15th ACM Conference on Information and knowledge Management, Nov. 6, 2006, 2 pages.
Shen et al. "Exploiting query history for document ranking in interactive information retrieval," Proceedings of the 26th Annual International ACM SIGIR Conference on Research and Development in Information Retrieval, Jul. 28-Aug. 1, 2003, 2 pages.
Nambiar et al. "Providing ranked relevant results for web database queries," Proceedings of the 13th International Conference on World Wide Web—Alternate Track Papers & Posters, May 19, 2004, 2 pages.
Kelly et al. "Chapter 9: Implicit Feedback: Using Behavior to Infer Relevance," In New Directions in Cognitive Information Retrieval vol. 19,, Jan. 1, 2005, 18 pages.
Indian Summons to attend Oral proceedings in Indian Application No. 1417/MUMNP/2009, dated Oct. 31, 2019, 2 pages (with English translation).

\* cited by examiner

PROVIDING RELEVANCE-ORDERED CATEGORIES OF INFORMATION

CROSS-REFERENCE TO RELATED APPLICATIONS

This application is a continuation of and claims priority to U.S. application Ser. No. 13/164,550, filed on Jun. 20, 2011, which is a continuation of and claims priority to U.S. application Ser. No. 11/624,175, filed on June Jan. 17, 2007 the entire contents of each are hereby incorporated by reference.

TECHNICAL FIELD

Various implementations in this document relate generally to providing relevance-ordered categories of information to a user.

BACKGROUND

Vast amounts of information are available on the Internet, the World Wide Web, and on smaller networks. Users of desktop, laptop, and notebook computers have long enjoyed rich content, like images, audio, video, animation, and other multimedia content from such networks. As the number of features available in mobile devices (e.g., cell phones, smartphones, personal digital assistants, personal information managers, etc.) has increased, user expectations for those devices have also increased. Users now expect that much of the rich content will also be available from their mobile devices. They expect to have access on the road, in coffee shops, at home and in the office through mobile devices, to information previously available only from a personal computer that was physically connected to an appropriately provisioned network. They want news, stock quotes, maps and directions, and weather reports from their cell phones; email from their personal digital assistants (PDAs); up-to-date documents from their smartphones; and timely, accurate search results from all their mobile devices.

Because input capabilities may be more limited in a mobile device (e.g., a smartphone) than in a fixed computing device (e.g., a desktop computer), more effort may be required of a user to enter a search query (or other information) from the mobile device than would be required of the user in entering the same search query from the fixed computing device. In addition, because displays in various mobile devices are often smaller than displays in fixed computing devices, it may not be possible to display as much information at any given time in a mobile device. Finally, data connections between a mobile device and various networked resources (e.g., the Internet) may be slower than corresponding data connections between a fixed computing device and the same networked resources.

SUMMARY

This document describes systems and techniques for providing relevance-ordered categories of information to a user. In some implementations, one or more categories of information (e.g., web information, image information, news information, navigational information, etc.) are provided to the user in response to a search query received from the user, and the first category of information is selected based on a prediction of the category of information the user is likely seeking. In some implementations, the prediction is made using rules generated by a machine learning system that has been trained using historical search data. In certain circumstances, the prediction may be made based on statistical correspondence (e.g., developed through analysis of other similar queries) between the query received and a specific category of information. In some implementations, the prediction is made based on a profile corresponding to a user profile associated with the query, while in others, the prediction is based on aggregated information across multiple users with or without regard to data about a particular user. In some implementations, the prediction is made based on a combination of factors, including, for example, the statistical correspondence between the received query and a specific category of information and a user profile associated with the query.

In some implementations, a computer-implemented method is disclosed. The method comprises receiving from a remote device a search query, generating a plurality of different category-directed result sets for the search query, determining an order for the plurality of category-directed result sets based on the search query, and transmitting the plurality of category-directed result sets to the remote device, in a manner that the result sets are to be displayed in the remote device in the determined order. The method may also include formatting the plurality of category-directed results to be displayed in a tabbed array in order of decreasing correlation between each category-directed result set and the search query. Determining the order may comprise calculating for each category-directed result set a likelihood value that represents a likelihood that a corresponding category-directed result set is responsive to the received search query.

In some aspects, determining the order further comprises ordering the category-directed result sets based on the calculated likelihood values. In addition, calculating the likelihood value can include retrieving a profile that is associated with the remote device and that includes a distribution of previously determined correlations between other search queries received from the remote device and one or more different categories of information; and factoring a portion of the distribution into the calculated likelihood. In addition, calculating the likelihood value can include retrieving data that is associated with other search queries received from other remote devices, the other search queries being substantially similar to the received search query, the data including a distribution of previously determined correlations between the other substantially similar search queries and one or more different categories of information; and factoring a portion of the distribution into the calculated likelihood. The distribution can include multiple sub-distributions, each sub-distribution being related to any one or more of a classification of device from which the query was received, a model or model group of device from which the query was received, a geographic area from which the query was received, and an approximate time of day at which the query was received.

In other aspects, calculating the likelihood value includes retrieving a profile that is associated with the remote device and performing a first calculation to obtain a first result based on a portion of the retrieved profile, retrieving data that is associated with the search query and performing a second calculation to obtain a second result based on a portion of the retrieved data, and performing a third calculation based on a weighted contribution of the first result and the second result.

In certain aspects, the search query of the method can be received from a mobile device. Also, the different categories can include three or more categories selected from the group consisting of location-based results, web results, images, video, shopping, blogs, maps, and books. The method may also include formatting the at least one of the plurality of category-directed result sets in a web document to be displayed with an array of selectable controls in a graphical user interface on the remote device, with each of the selectable controls corresponding to a different category of information. In addition, the method may include generating code to display a scroll arrow that, when selected, causes the array of selectable controls to scroll. Also, the order of the plurality of category-related result sets can be determined based on a correlation between the search query and aggregated prior user activity relating to the search query or related search queries, and categories for the result sets.

In another implementation, a system for generating ordered search results is disclosed. The system comprises a search query processor configured to receive and process a search request from a remote device, a search engine that receives the processed search request and generates a plurality of category-related search results, and a results ranker that orders categories containing the category-related search results. The system may also comprise a profile database that stores profiles associated with specific remote devices for use by the results ranker in ordering the categories. In addition, the system may comprise a relevance filter that stores data about other search queries received from other remote devices, the data including distributions of previously determined correlations between the other search queries and one or more different categories of information. The results ranker may be configured to use the data stored in the relevance filter in ordering the categories.

In some aspects, the results ranker is configured to order categories based on a) a profile associated with the remote device and b) relevance data correlating other search queries received from other remote devices and one or more different categories of information, the other search queries being substantially similar to the search request. Also, the plurality of category-related search results can include three or more categories selected from the group consisting of location-based results, web results, images, video, shopping, blogs, maps, and books. The system may also include a results formatter that formats at least one of the plurality of category-related search results in a web document to be displayed in a graphical user interface on the remote device with an array of selectable controls, each of the selectable controls corresponding to a different category of information.

In yet another implementation, a system for generating ordered search results is disclosed. The system includes a search query processor configured to receive and process a search request from a remote device, a search engine that receives the processed search request and generates a plurality of category-related search results, and a means for ordering the category-related search results in categories of search results. The system may also include a relevance filter that stores relevance data, wherein the relevance data includes distributions of previously determined correlations between other search queries received from other remote devices and one or more different categories of information, the other search queries being substantially similar to the search request. In addition, the system may include a results formatter that formats at least one of the plurality of category-related search results in a web document to be displayed in a graphical user interface on the remote device with an array of selectable tabs, each of the selectable tabs corresponding to a different category of information.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
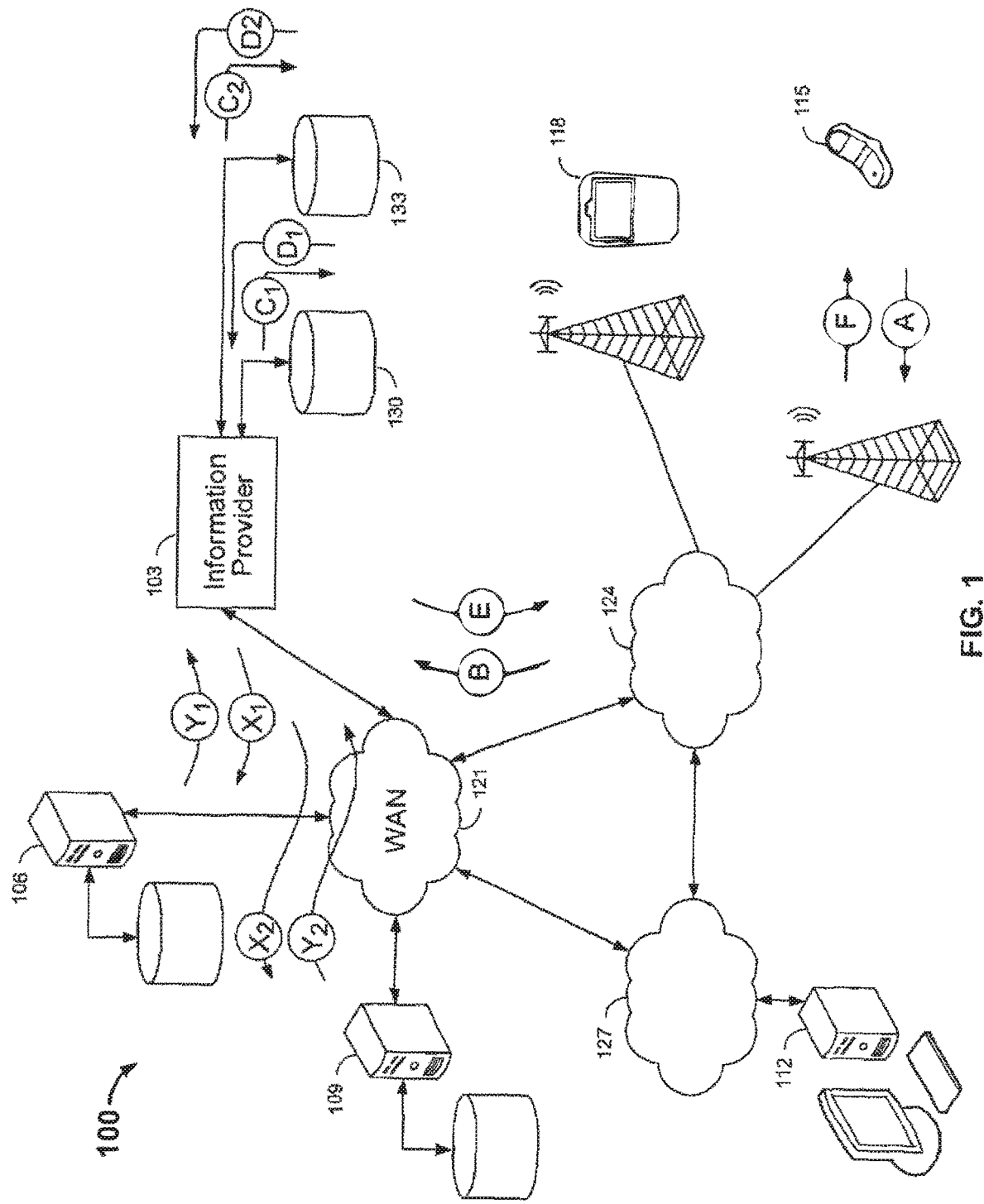
FIG. 1 is a block diagram of an example system that can receive queries, generate result sets responsive to the queries and order the result sets.

The systems and techniques described in this document relate generally to providing information to an electronic device in a manner that is likely to be relevant to a user of the electronic device. The results may be displayed as search results categorized into a plurality of result sets or groups, such as is done with Google search results categorized, for example, as web, image, blog, scholar, desktop, maps, news, video, and other sets. The set that is initially displayed to a user, and the order of icons that represent the other sets, may be established to provide a user with results in positions that are predicted to be the most helpful to the user. For example, if a user enters "pizza places," such a search may be determined to be highly correlated with "local" search, so that search results associated with the "local" set of search results are initially displayed to the user, and, for example, "news" results are shown very low in the stack or are not shown at all (if they are deemed to be irrelevant enough).

In some implementations, the electronic device is a mobile computing device, such as a cell phone, smartphone, personal information manager, etc. In particular, for example, systems and techniques are described for receiving a query from an electronic device; generating a number of result sets that are responsive to the query, where the contents of each result set fall into a particular "category" of information (e.g., web content, image content, news, maps, etc.); ordering the result sets based on likelihood that the corresponding category of each result set is most relevant to a user of the electronic device; formatting the ordered result sets for presentation in the electronic device; and transmitting the ordered, formatted result sets to the electronic device for display.

The result sets may include, for example, the familiar sets of web content, images, book search, video, maps, and local search, which have been traditionally displayed as separate search result selections grouped by the particular corpuses of information represented by each category. Those groups may be organized by displaying tabs that are sorted in an order of decreasing calculated relevance to a search query for each category. For example, the images-directed group of results may be determined to be most responsive to a query for "Marilyn Monroe" or "James Dean." In such a situation, various images may be displayed initially as a search result, with the remaining groups sorted in decreasing relevance (e.g., shopping, then web, then blogs, then news). In contrast, a scholar or scientific articles-directed group may be determined to be most relevant to a query for "polydicyclopentadiene," and the remaining groups may be sorted accordingly (e.g., web, then blogs, then news, then shopping, then images). Certain categories may be left off the results entirely (and thus save, e.g., on transmission bandwidth and on unnecessary clutter caused by the display of bad results) if they are determined to be sufficiently non-responsive, or they may be held and only accessed if a user selects a "more" control to display the extra, less relevant groups.

Various techniques are described for ordering the result sets. For example, result sets may be ordered by a determined correlation between a particular query (including all of a query or part of a query) and a particular group, including by aggregated observations of user behavior in response to receiving query results. For example, it may be observed that most users who query on "Marilyn Monroe" click an "images" control even if the initial results are provided as web results. Such user behavior may indicate that users associate the query closely with images and thus prefer to have images displayed first. The correlations between search terms (or, for example, portions of search terms) and search results (or portions or other attributes of search results) may be computed by a machine learning system, as described in more detail below.

Also, result sets can be ordered based on a profile associated with the electronic device or with a user of the electronic device; result sets can be ordered based on a determined or calculated likely relevance to users of specific classes of electronic devices (e.g., mobile or non-mobile electronic devices); result sets can be ordered based on a combination of a profile and a determined or calculated relevance; on result quality; or on other factors.

A more specific example of generating and ordering results in response to a query is now provided and referenced throughout this document. Consider Joe, a college student and cell phone user, and Jane, a stockbroker and smartphone user. Joe may regularly use his cell phone to obtain directions to locations throughout the city in which he resides in order to meet his friends for social engagements. Jane may use her smartphone throughout the day to check stock prices or news associated with various publicly traded companies. Both Joe and Jane may use their respective mobile computing devices to enter a particular search query, for example, for "Starbucks," but each may enter the query for a different reason. Joe may want a map to the nearest Starbucks coffee shop, while Jane may desire to know the price at which Starbucks' common stock is currently trading. As is described in greater detail below, a system can provide Joe and Jane with particular categories of information that are most closely correlated with the queries they enter, as determined from general internet usage across thousands of users, so that a term like "Starbucks" is generally associated with "local" search followed by "news" items, and whereas "SBUX" is generally associated with the stock ticker symbol, perhaps followed by "news" items. The generated search result groups may be ordered accordingly. In certain examples, the system may process the same query (e.g., "Starbucks") from both Joe's cell phone and Jane's smartphone and determine the (possibly different) category of information (e.g., "local" navigation information, stock price information) that is most likely to be relevant to each user.

Advantageously, the system described herein can, in certain implementations, enhance a user's experience by minimizing the number of operations each user must perform in order to obtain the information he or she desires. Time required to retrieve relevant information may be minimized, data traffic may be minimized, and user satisfaction may be increased. In addition, satisfaction may increase due to the system's segmentation of data into logical, understandable groups for the user. For example, certain users may not even think to break results up into sub-groups, and may simply think of themselves searching the entire "web"; the techniques here may provide users with more targeted, corpora-based results.

FIG. 1 is a block diagram of an example system 100 that can receive queries from various users' electronic devices (e.g., Joe's cell phone or Jane's smartphone); generate result sets that are responsive to the queries and that each include a different category of information; order the result sets in a manner that is determined to be most likely relevant to each user; and transmit the ordered result sets to each user. For example, the system 100 can receive a query for "Starbucks" from Jane's smartphone and generate result sets that include information related to "Starbucks" that is categorized as map information, image information, news information, or stock information. In this document, a "query" or "search query" should be understood to include any kind of data request that could be fulfilled by multiple categories of information. The system 100 can determine or calculate that the user of Jane's smartphone (e.g., Jane) is most likely to be interested a particular category of information related to "Starbucks," can order the result sets in the appropriate manner, and then transmit the ordered result sets to Jane's smartphone for display.

In some implementations, multiple result sets, each classified corresponding to its own category of information, are transmitted to the electronic device that submitted the query (e.g., categories of information that include stock information, map information, news information, image information, etc.), but the result sets can be formatted in a manner that reflects the determined or calculated order. For example, in response to Jane's query, stock information may be presented first, followed by map information, followed by news information, followed by image information. The information may be placed in front-to-back order, top-to-bottom order (e.g., with expandable modules for each category), side-by-side (e.g., with scrollable panels) order, or in another appropriate order. The system 100 can receive the same query (e.g., "Starbucks") from a different electronic device (e.g., Joe's cell phone) and calculate or determine that a user of that electronic device (e.g., Joe) is most likely to be interested in different categories of information.

In some implementations, the system 100 generates the same result sets (corresponding to the same categories of information) in response the query received from Joe's cell phone as were generated in response to the query received from Jane's smartphone, but the result sets are formatted to reflect a different determined or calculated order for presentation of the various categories of information. For example, in response to Joe's query, map information may be presented first, followed by news information, followed by image information, followed by stock information.

To receive and process queries from electronic devices, the example system 100 can include an information provider 103. In some implementations, the information provider 103 includes a search engine (e.g., a search engine like that provided by Google) that indexes various categories of information that are either stored internal to the information provider 103 or external to the information provider 103. The search engine can receive a query for information, search its indexes of different categories of information, and provide a list of relevant content that is classified in one or more categories of information. The list of relevant content may include a list of references to the content, rather than the content itself. Or the list of content may include actual content or previews of the actual content. For example, a list of relevant news content may include various links to news content that is stored external to the information provider 103. Each link may be associated with a preview of the actual available information, such as a headline and/or story hook, to help the user decide whether to follow a particular link and access the actual content. As another example, a list of relevant image content may include links to various image sources, along with low-resolution previews or thumbnails of available images to help a user decide whether to follow a particular link and access the actual image.

In some implementations, actual content that is indexed by the information provider 103 is stored in various content providers, such as the content providers 106 and 109. In some implementations, each content provider 106 or 109 stores content belonging to a particular category of information. For example, the content provider 106 might only store image information, while the content provider 109 may only store news information. In other implementations, various content providers each store and provide multiple categories of information. The content providers 106 and 109 may be operated by a single organization or by multiple organizations.

As shown in FIG. 1, various networks couple the information provider 103, the content providers 106 and 109, and various electronic devices (e.g., a desktop computer 112, a cell phone 115, and a smartphone 118) that can access information provided by the information provider 103 or stored at the content providers 106 or 109. For example, a wide area network (WAN) 121, such as the Internet, can couple the information provider 103 and the content providers 106 and 109, and can facilitate data exchange between the various providers 103, 106 and 109.

Other networks can couple various other devices to each other and to the information provider 103 or content providers 106 or 109. For example, a wireless network 124 can couple various mobile wireless devices (e.g., a cell phone 115 and a smartphone 118) to each other. In some implementations, the wireless network 124 is coupled directly to the WAN 121; in other implementations, the wireless network 124 can be coupled to the wide area network 121 through another network 127, such as the public switched telephone network (PSTN). As shown, non-mobile, or fixed, devices such as a desktop computer 112 can also access various resources of the system 100 through, for example, a connection to wide area network 121 or a connection to the PSTN 127.

An example flow of information in the system 100 is now provided with reference to the scenario above, in which Jane uses her smartphone (e.g., smartphone 118) to query the information provider 103 for information related to "Starbucks." In this example, Jane may enter a query for "Starbucks" on her smartphone 118, directed to the information provider 103 (e.g., Google). When Jane "submits" the query, her smartphone 118 causes the query to be transmitted to the information provider 103 via the wireless network 124 and the wide area network 121, over paths A and B, respectively.

The information provider 103 receives the query and may, in response, generate multiple corresponding internal queries for different categories of information. For example, the information provider 103 may generate a first corresponding query for images related to Jane's "Starbucks" query; the information provider 103 may generate a second corresponding query for stock information related to Jane's "Starbucks" query; other corresponding queries may also be generated for other categories of information (e.g., web content, news, map information, etc.).

In some implementations, each corresponding query may be processed in conjunction with a different index maintained by the information provider 103. For example, the corresponding query for images related to "Starbucks" may be transmitted to an image index 130 via path $C_1$, and in response, the image index 130, in cooperation with the information provider 103, may return an image results set via path $D_1$; similarly, the corresponding query for stock information related to "Starbucks" may be transmitted to a stock index 133 via path $C_2$, and in response, the stock index 133, in cooperation with the information provider 103, may return a stock related result set via path $D_2$. For illustration, the queries have been shown as being submitted to the indexes, though in a more technical sense, the queries would be submitted to portions of a search engine that draw upon each of the particular indexes.

Certain result sets may include lists of search results, such as image or web search results. Other result sets may include a single result. For example, where information about the user's location is known, various "local" results may be generated. In the example, a "Starbucks" query may generate information about the Starbucks that is closest to the inferred (e.g., via a default location for a user, or the indication of a town name or zip code in a query) or determined (e.g., via GPS coordinates from the user's device) location of the user. Likewise, weather results may include a single result for a user rather than (or in addition to) a list of various weather-related results. Other, non-local related information may also generate a single-entry set, such as stock information returned for a "Starbucks" query.

Such single-entry results may be displayed differently than are multiple-entry results. As an example, certain classes of results (which may be referenced as a "one box") may have specific formats, such as the display of weather by showing a large number representing the current temperature and a related graphic (e.g., sun or cloud), along with smaller displays showing a forecast. The formatting of the result, as opposed to listing results as a simple numbered list, may produce more pleasing and easier-to-understand results that can be viewed in less screen space and with less need for the user to navigate through results/Such "one box" displays may also be grouped with other categories of information, e.g., displayed as a tab in an array of tabs, or may be displayed in a different manner.

After obtaining or generating several result sets, the information provider 103 can determine an appropriate order for providing the result sets, format the result sets for display on the device from which the original query was received (e.g., the smartphone 118) and transmit one or more of the ordered, formatted results to the originating device (e.g., via paths E and F). Certain of the formatting operations may also be performed by the originating device (e.g., using JavaScript or other appropriate mechanisms). Exemplary techniques and methods for ordering the result sets are described in greater detail below.

In some implementations, in order to maintain the indexes used in generating various result sets, the information provider 103 automatically gathers and indexes information about available content (e.g., content stored by the content providers 106 and 109). For example, an automated information gatherer (e.g., a web crawler or spider-shown in and described in greater detail with reference to FIG. 2) can periodically request and retrieve available content from the content provider 106 via paths $X_1$ and $Y_1$, respectively, and index this available content in the index 130 (e.g., an index of image information). Similarly, the information provider 103 can periodically request and retrieve available content from the content provider 109 via paths $X_2$ and $Y_2$, respectively, and index this available content in the index 133 (e.g., an index of stock information).

The system 100 that is illustrated in FIG. 1 and described above is merely exemplary. Other similar systems can take other forms. For example, various other networks can be employed to couple the devices and information and content providers shown in FIG. 1. Each content provider 106 and 109 is shown as a single device, but content providers can include multiple devices that are interconnected by various local and wide area networks. Similarly, the information provider 103 can be a distributed system that includes tens, hundreds, thousands or more devices for indexing, storing and providing various categories of information, and the reader will appreciate that the devices that may be part of the information provider 103 can be networked together in various ways.

Figure 2:
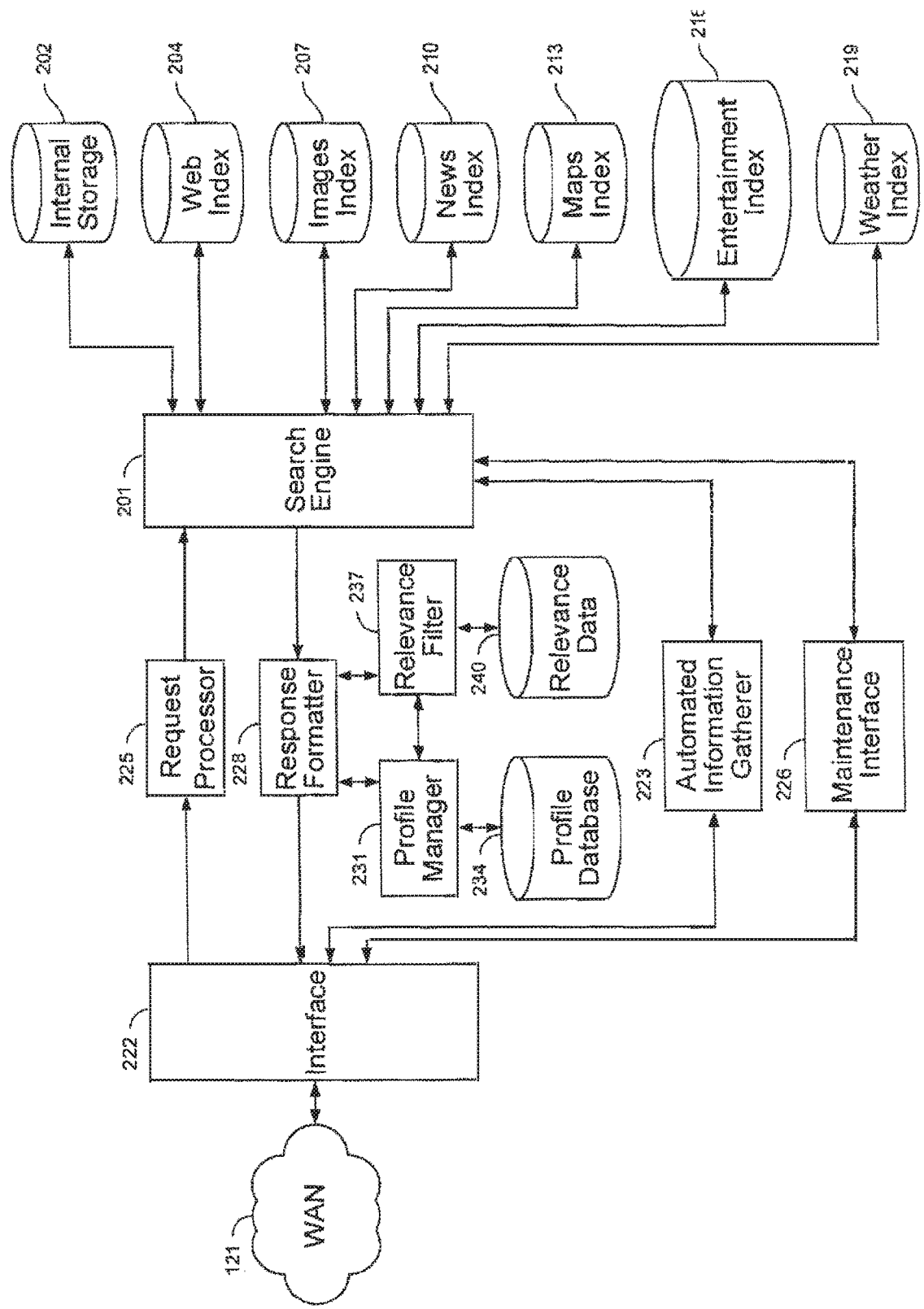
FIG. 2 is a block diagram showing additional details of the information provider that is shown in FIG. 1.

FIG. 2 is a block diagram showing additional exemplary details of the information provider 103 that is shown in FIG. 1. As described above, the information provider 103 can be configured to receive queries from various electronic devices; generate multiple result sets in response to each received query, where each result set may correspond to a different category of information; order the multiple result sets in a manner that reflects a likely relevance to each result sets to a user of the electronic device from which the query was received, format the ordered result sets for display in the electronic device, and transmit the ordered, formatted result sets to the electronic device.

In one implementation, as shown, the information provider 103 employs a search engine 201 and a number of indexes for indexing or organizing different categories of information. Each index may contain data that represents information that the information provider 103 can provide to users. For example, the search engine 201 may include a typical Internet search engine, and the various indexes can include links to information stored outside the information provider. The information provider 103 can provide links to users (e.g., in response to search queries), and the actual information corresponding to the links can be provided upon selection of the links by the users.

Some information referenced by entries in the various indexes may be stored within the information provider 103 (e.g., in internal storage 202). For example, the internal storage 202 may "mirror" information for which search queries are regularly received, such as, for example, breaking news stories, or weather or traffic information. The internal storage 202 may also store various components needed for general operation of the information provider 103, such as applications system parameters, and information about users who access the system.

In one implementation, as shown, the information provider 103 may maintain various indexes corresponding to different categories of information. For example, the information provider 103 can include a web index 204 for indexing web information, an images index 207 for indexing image information, a news index 210 for indexing news information, a map index 213 for indexing maps of various physical locations, an entertainment index 216 for indexing entertainment information, and a weather module 219 for obtaining and organizing weather information. In other implementations, the information provider 103 may maintain a single index that indexes all categories of information, including those categories depicted by the indexes 204 to 219. The listed categories of information are merely exemplary. Various other categories of information may be available and indexed. Moreover, the indexes themselves may be arranged differently. For example, one index may handle multiple categories of information.

The various indexes (or index) may or may not be cached. For example, the indexes 204-219 may correspond to a separate cached index database or databases (not shown) to support faster access to search results. The indexes 204-219 (or index) may be local to the information provider, or they may include an external server or storage farm (not shown). In general, each index may be distributed across many different machines and many different physical locations. For example, an index may be implemented by hundreds or thousands of storage devices in multiple data centers around the globe. The internal storage 202 may also be local or distributed.

As shown in one implementation, the information provider 103 interacts with the other devices through an interface 222. In some implementations, the interface 222 includes one or more web servers or application servers through which queries are received and from which information responsive to the queries is transmitted. The interface 222 is shown as a single interface, but the interface 222 can include various other internal interfaces through which information can be routed internal to the information provider. As an example, the interface 222 may comprise interface devices for a high-speed, high-bandwidth network such as SONET, Infiniband, Ethernet, Fast Ethernet, Gigabit ethernet, or any suitable communication hardware operating under an appropriate protocol, such that the information provider 103 can respond to a large number of distinct requests simultaneously. The interface 222 may include network interface cards (NICS) or other communication devices and other components or interfaces common to a high-speed, high-bandwidth network. The precise design of the information provider 103 is not critical to this document and can take any suitable form.

As mentioned above, information in the various indexes 204-219 can be gathered by an automated information gatherer 223, such as, for example, a crawler or spider. In some implementations, the automated information gatherer 223 continuously or almost continuously obtains new information from sources connected to the WAN 121 or from other sources (not shown) connected to the information provider 103. This new information can be provided to appropriate indexes 204-219 or to the internal storage 202. In addition to being added to various indexes 204-219 or to the internal storage 202 in an automated fashion, information can be manually loaded in or retrieved from the various indexes 204-219 or from the internal storage 202 through a maintenance interface 226. In some implementations, the maintenance interface 226 can allow an administrator of the information provider 103 to manually add bulk data.

Data requests, such as search queries, can be processed by a request processor 225. The request processor 225 can, in some implementations, parse search queries or other data requests, and if necessary, reformat them to search strings or search terms that are compatible with the search engine 201. For example, in some implementations, the request processor reformats search queries received in HTTP Hypertext or text format to a format or protocol employed by the search engine 201 The request processor 225 may also refine received search queries or requests for data, by removing articles, prepositions or other terms deemed to be "non-essential" to completing a search or data access.

In one implementation, as shown, the information provider 103 includes a response formatter 228 for formatting information responsive to a search query or request for data. In some implementations, the response formatter 228 formats the information in a manner that facilitates display of the information in the specific device from which the corresponding query was received (e.g., in a format such as HTML, XML (extensible markup language), WML (wireless markup language), or some other suitable format).

When the responsive information includes multiple categories of information, the response formatter 228 can also order each category of information such that a category of information that is determined or calculated to be most relevant to the corresponding query is presented first, or in some more prominent manner than other categories of information that may be less relevant to the original query. Various example methods of ordering categories of information are described in greater detail below, and can include, for example, machine learning applied to pairs of search terms and search results or search result categories, maintaining a profile for users associated with search queries, and otherwise maintaining a relevance filter that correlates specific search queries or information requests to specific categories of information that are most likely to correspond to the specific search queries.

To maintain profiles for users who submit search queries, the information provider 103 can, in some implementations, include a profile manager 231 and corresponding profile database 234. In the implementation shown, the profile database 234 can track various categories of information for that particular users frequently search. For example, the profile database 234 may maintain a distribution of relevant categories of information searched by a particular user, relative to all search queries received by the user. In particular, with reference to Joe and Jane, the profile database 234 may include a profile for Joe to track, for example, that 53% of Joe's search queries are for map information; similarly, the profile database 234 may include a profile for Jane to track, for example, that 61% of Jane's queries relate to stock information. In some implementations, a relevant profile is updated each time a new search query is received and/or each time the information provider 103 determines the category of information to which a search query is to be correlated. Multiple profiles may also be kept for one user, such as a profile while using a desktop PC (which may reflect more web search) and a profile while using a desktop mobile device (which may reflect more local search).

In some implementations, the profile manager 231 associates a particular profile with a particular user based on information in the search query itself (e.g., a user account identifier included with the search query, an electronic device identifier included with the search query, etc.). Upon identifying a particular profile, the profile manager 231 can retrieve corresponding profile information and transmit it to the response formatter 228, for example, for use in ordering different categories of information that are responsive to the search query. Various methods of determining a category of information (e.g., for updating profiles) sought by a user are described in greater detail below.

To correlate particular queries or parties of queries to particular categories of information, the information provider 103 can, in some implementations, include a relevance filter 237 and corresponding relevance database 240. The relevance may be expressed by a set of scores or a set of rules or both. For example, a machine learning system may be provided with a set of data, such as logs of prior search queries (or other instances of use of a system), and perhaps information about reactions to the queries (e.g., whether particular search results were clicked on, or whether a particular group of results was selected for display after the initial search results were shown). The information provided to the system may be labeled, such as indicating the nature of each piece of information, e.g., whether it was associated with a "local" search or not. The label may be positive or negative, to indicate, respectively, whether it is part of the class of instances to be classified, or not.

The information may also include features, which can be Boolean (e.g., indicating that the feature is present or absent) or continuous (e.g., indicating that the feature has an associated real value). Features may be represented by strings, or by a fingerprint of a string, represented by a pair in the form of feature_type:value. Feature types may include, for example, queries, urls, and scoring components for ranking of search results. Features may be selected so that the number of present features per instance is relatively low, such as under 300.

In addition, the information may include prior probability indicators, which are the probabilities that particular instances are positive, without looking at any of the features. One exemplary default value for the prior probability is the number of positive training instances over a total number of training instances. A log odds of an event can be determined from the probability (p) of the event as: $\ln(p/(1-p))$.

From analyzing a set of training data, a system may generate a set of rules, such as rules for identifying whether search results in particular groups should be ranked above results in other groups in terms of displaying the results in a visually otherwise prominent way to a user. Each rule may include a condition (i.e., combinations of features, such as the features for an instance multiplied together). A condition matches an instance if it has all the features in the condition. Weights can also be applied to each rule, where a weight (which may be positive or negative) measures a change in the log-odds that a label is positive if a condition matches an instance. The system may be configured to create a set of rules that together provide the probability that a given instance has a positive label, by maximizing the training data without over-fitting it.

In one example relevant here, such a machine learning system may be provided with training data in the forms of queries, along with indications of the type of corpus or category with which a user correlated each query. The various features may include the entire query or parts of the query, such as single particular terms in the query. In addition, the features may include other parameters of the query, such as the language of the query, the location from which the query was submitted (determined, e.g., by a domain associated with the submission of the query), and a determined quality level of results provided in response to the query.

In one implementation, the relevance filter 237 can store each received instance of a particular search query (e.g., a search query for "Starbucks") and can also or alternatively track a determined correlation between the query and a particular category of information (e.g., web information, image information, news information, map information, etc.). In addition, as noted above, the filter 237 may contain scoring or rules data to be applied to various inputs such as queries, in generating an indicator of a predicted relevance for categories of data returned as search results.

In some implementations, the relevance filter 237 is updated each time a new search query is received by the information provider 103 and again when the information provider 103 determines the category of information to which the search query was directed. Alternatively, batch processing and updating of scoring data or rules may occur. In some implementations, relevance information corresponding to a specific search query may be provided to the response formatter 228 for use in ordering categories of information that are responsive to a particular search query.

Figure 3A:
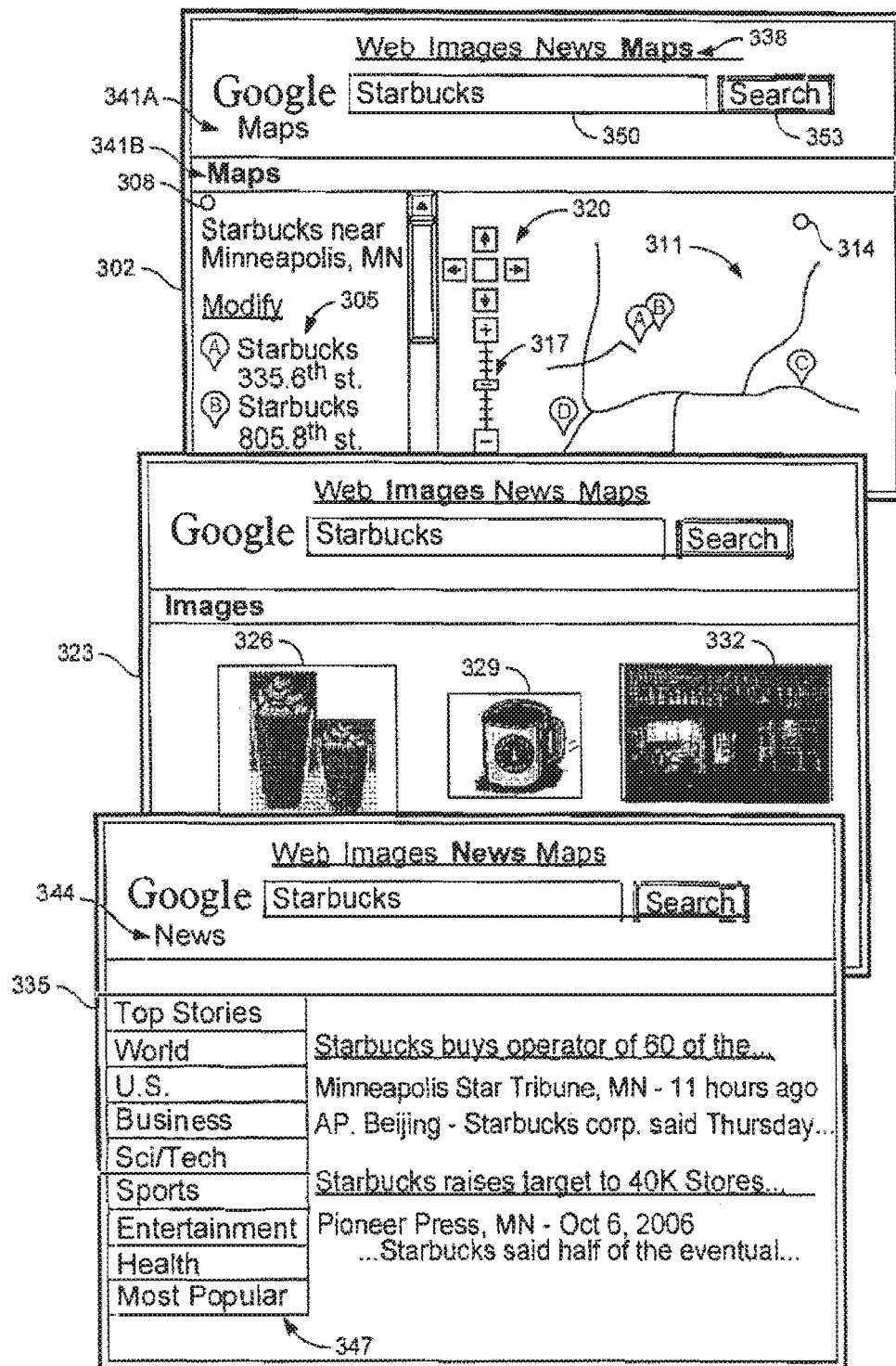
FIGS. 3A and 3B are screenshots illustrating various exemplary categories of information that can be provided in response to a query.
Figure 3B:
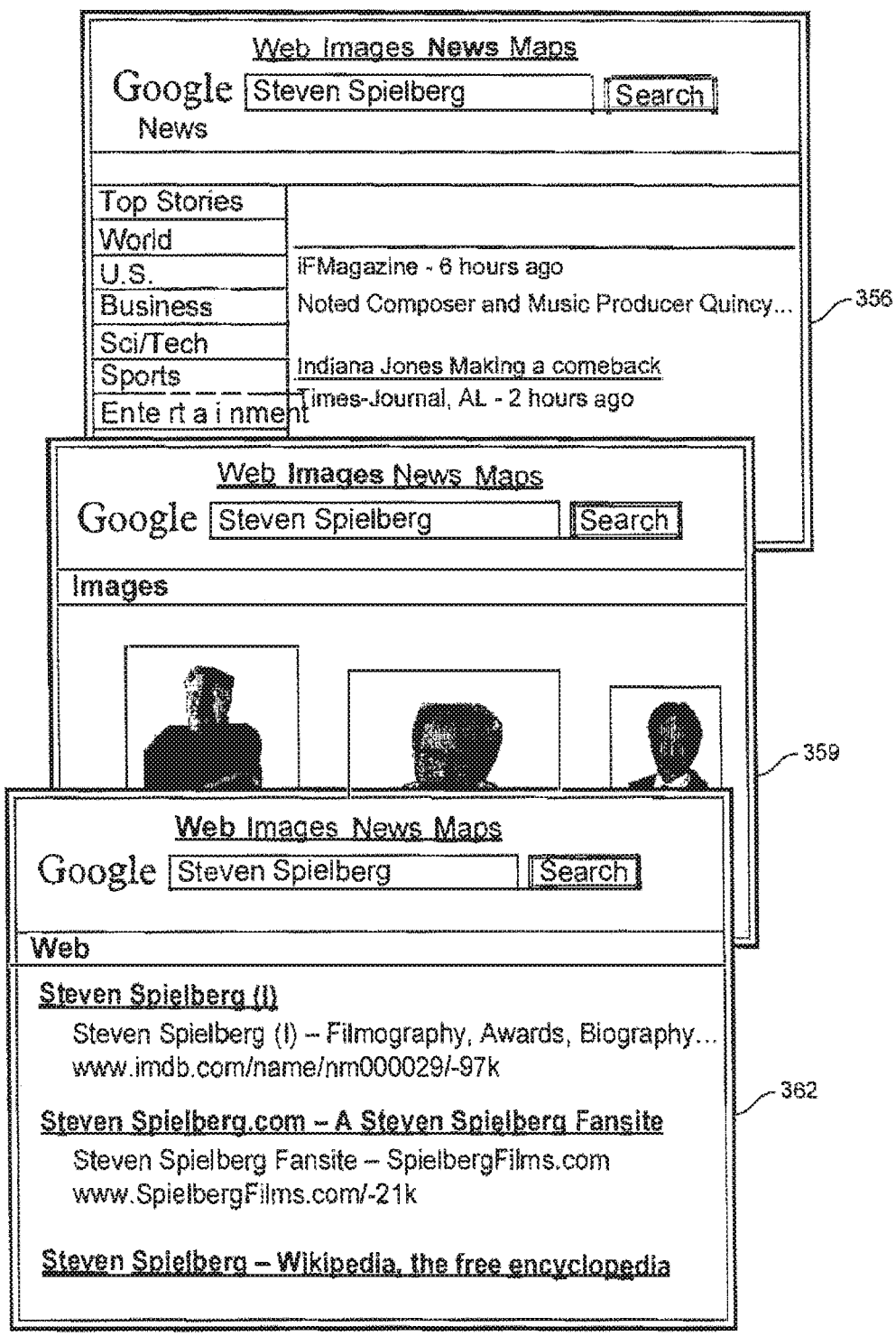
Figure 4B:
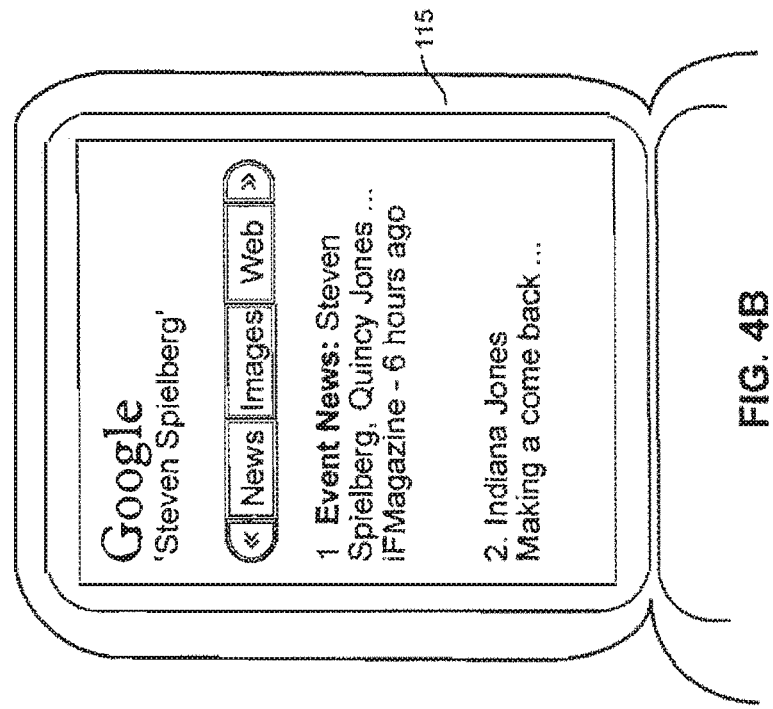
FIGS. 4A-4D are additional screenshots illustrating various exemplary categories of information that can be provided in response to a query.
Figure 4A:
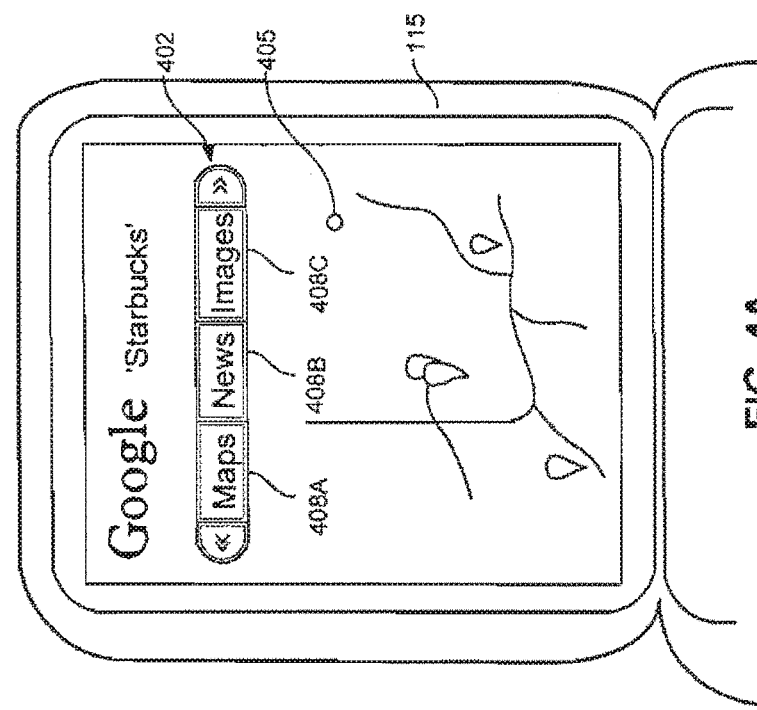

FIGS. 3A and 3B illustrate various example categories of information that can be provided in response to a user query. FIG. 3A depicts exemplary information that may be provided in response to a query for "Starbucks." FIG. 3B depicts exemplary information that may be provided in response to a query for "Steven Spielberg." For purposes of example, FIGS. 3A and 3B illustrate information that is formatted for a larger display, such as a display that may typically be included in a non-mobile device such as a desktop computer, or a larger mobile device, such as a laptop computer; FIGS. 4A and 4B illustrate information that is formatted for a smaller display that may be typically included in a mobile communications device, such as a smartphone or cell phone. The reader will appreciate, however, that, unless specifically noted otherwise, the systems and methods described in this document are not limited to either "mobile" or "non-mobile" devices, nor are they limited to devices having "larger" displays or to devices having "smaller" displays.

As shown in FIG. 3A, one category of information that may be provided in response to a query for "Starbucks" is local location information (e.g., maps and directions) associated with Starbucks coffee shops near a particular location (depicted by a screenshot 302). The location information can include a list 305 of physical locations (e.g., Starbucks coffee shops) corresponding to the query and relative to a specific geographic area (e.g., Minneapolis, Minn.).

As shown in one implementation, the street addresses of each location are provided in an address pane 308, and an annotated map 311 is provided in a map pane 314 that graphically depicts the physical location of each address.

Various controls can be provided to allow a user to manipulate the annotated map 311. For example, zoom controls 317 can be provided to allow a user to zoom in on map information associated with a particular location, and pan controls 320 can be provided to allow a user to adjust the center of the map by scrolling the map to one side or another, or towards the top or bottom. Other controls and features can be provided. For example, in some implementations, user selection of an annotation on the map (e.g., by clicking the location with a mouse or other pointing device, or by selecting a button on a telephone keypad corresponding to a search result icon) can cause the location information to be highlighted or additional location information to be provided (e.g., a telephone number associated with the physical location, nearby street intersections, store hours, etc.).

Another category of information that may be provided in response to a query for "Starbucks" is image information, as is depicted by a screenshot 323. As shown in one implementation, the image information can include images of products offered by Starbucks coffee shops (e.g., particular coffee drinks 326, or a particular coffee mug 329), or images of particular coffee shops (e.g., a storefront 332). In some implementations, additional information can be provided upon selection of an image (e.g., by a user clicking on an image with a mouse or other pointing device), such as information about the source of the image, or a link to a website that provides the image or a product associated with the image.

Another category of information that may be provided in response to a query for "Starbucks" is news information, as is depicted by a screenshot 335. In one implementation, the news information can include news releases issued by Starbucks itself, or news articles by various news agencies or news providers about Starbucks. In some implementations, news articles are sorted by quality of result, as indicated, for example, by recency of an article, the quality of the site producing the article, and other factors.

Various other categories of information may also be available in response to a query for "Starbucks." For example, stock information (not shown) may be available, and may include a current stock price, trading volume, an indication of whether the stock price has recently increased or decreased, information about directors or executives associated with the corresponding corporation, etc. As another example, other general "web" information (not shown) may be available in response to a query for "Starbucks" and may include links to various websites, blogs or articles that discuss, for example, various aspects of Starbucks' coffee products, Starbucks' corporate policies, specific Starbucks' stores, music or concerts offered at specific Starbucks' locations, etc. As other examples, other information may include video information, shopping information, electronic books or periodicals, etc.

In addition, where the intent of a search can be determined to a sufficient degree of certainty, a "one box" result may be provided, such as in the form of a summary of actual information that is responsive to a query. For example, when "weather" is the query, a preformatted display of current weather conditions and a multi-day forecast may be shown, along with hyperlinks to more detailed information such as animated weather maps. Where a one box can be determined, it may be displayed initially, apart from any particular categories of information, and a user may then select controls associated with particular categories of results. Also, a list of results may be displayed below a one box.

In some implementations, as shown in the screen shots 302, 323 and 335, each category of information is displayed with various navigation tools to allow a user to easily navigate to other kinds of information. For example, the screenshot 302 illustrates navigation controls 338 that allow a user to quickly navigate from map information to, for example, web information, image information or news information. Other navigational controls may be provided in conjunction with certain categories of information. For example, as shown in the screenshot 335, a navigation bar 347 can be provided with news information, to allow a user to navigate from query-specific news information (e.g., news information related to "Starbucks") to more general news categories (e.g., world news, U.S. news, business news, etc.).

In FIGS. 3A and 3B, the navigation controls 338 are all shown ordered in a single order; as described more fully below, however, the ordering may change depending on the context, such that, for example, the most relevant group of results has its corresponding navigation control displayed more prominently (e.g., in the left-most positions) than the controls for other groups. Such ordering of controls may be particularly beneficial on smaller displays, where controls for all relevant categories cannot be easily displayed at one time.

Various indicators may be provided to alert a user to the category of information he or she is currently accessing. For example, in the screenshot 302, "maps" is shown in bold and is not underlined (i.e., lacking a hyperlink that can be selected), indicating that map information is currently being displayed, whereas "web," "images" and "news" are underlined, indicating their status as links to other categories of information. As another example, supplemental indicators may be provided to indicate the category of information being displayed, such as the "maps" indicators 341A and 341B in the screenshot 302, or the "news" indicator 344 in the screenshot 335. Also, where tabs are provided, the selected tab can be shown to connect directly to the results display, while other tabs may have horizontal lines separating them from the results, in a conventional manner for displaying tabbed interface elements.

Results can also be displayed be category in vertically aligned expandable modules, with a title for each module displayed, and with the most relevant module at the top. Selection of a title van cause the corresponding module to expand into a box showing additional information, and additional selection can cause the box to collapse back to the next title. In addition, categories may be displayed on side-by-side scrollable cards, with or without indicators on each side of a display showing which category is to the left or right.

In the above examples, each category of information corresponds to a single query, but in some implementations, a user can enter a new query that causes information to be displayed in response to the new query. For example, a user could enter a new query in the query box (e.g., query box 350) shown in each of the screenshots 302, 323 or 335, and initiate the new search for information related to the new query by selecting the corresponding "search" control (e.g., search control 353). Once the new search has been run, various categories of information may be available that are related to the new search query (e.g., maps information, web information, news information, image information, etc.).

As shown in FIG. 3B, various categories of information may be available in response to a query for "Steven Spielberg," including, for example, news information, as shown in screenshot 356; image information, as shown in screenshot 359; and web information, as shown in screenshot 362. In some implementations, certain categories of information may only be available in response to certain queries. For example, no map information or stock information may be available in response to a query for "Steven Spielberg."

In some implementations, the category of information that is displayed in response to a query is selected by a default configuration parameter. For example, for queries received by certain computing devices, such as non-mobile desktop machines, web information may always be presented to a user, along with the option to select other categories of query-responsive information (e.g., image information, news information, map information, etc.).

In other implementations, different categories of information may have dedicated initial search pages, and the category of information that is first presented may be based on which dedicated initial search page the user employs to enter the search query. In particular, map information may be associated with a dedicated maps search page, and by default, map information may be initially provided in response to queries received from the dedicated maps search page-even though controls may also be provided, such as the controls 338, that enable a user to receive other categories of information in response to the same query. Similarly, image information may be associated with a dedicated image search page, and by default, image information may initially be provided in response to queries received from the dedicated image search page-even though a user may be able to receive other categories of information through selection of various controls, such as the controls 338.

The categories may be ranked for display according to rules or scores generated in various manners, such as according to the machine learning approach discussed above. In still other implementations, as is described in greater detail below, the category of information that is first presented to a user may depend on a process that factors in parameters such as statistics associated with a specific query, the type of device from which the query is received ("mobile," "non-mobile," handheld, device with a 4.5 inch screen, device with a 1.2 inch screen, etc.), a profile corresponding to a user account that is associated with a query, some combination of the above parameters, or other parameters. Each of these parameters is discussed in turn here.

In a system that receives queries from users and provides various categories of information in response (e.g., the information provider 103), certain queries may be repeatedly received and processed. For example, a system that processes tens of thousands of queries or more each day may receive tens or hundreds of queries each day for both "Starbucks" and "Steven Spielberg." In some implementations, the system can be programmed to analyze the desired category of information most often associated with each of the queries. For example, the system may be able to determine that users entering queries for "Starbucks" are generally interested in finding articles about Starbucks' corporate policies, or maps showing locations of nearby Starbucks coffee shops, and that users are generally less interested in finding stock information about Starbucks or image information related to Starbucks merchandise. As another example, the system may be able to determine that users entering queries for "Steven Spielberg" are generally most interested in locating news articles reporting on Hollywood gossip related to Steven Spielberg or images showing pictures of the director, and users are generally less interested in finding map information or stock information related to "Steven Spielberg," as such information may not even be "relevant" (i.e., generally associated with a search query for "Steven Spielberg").

The system can be programmed to determine, in a number of ways, the category of information in which users who enter specific queries are most interested. For example, the system could determine a dedicated search page from which a specific query is most often received. In particular, if queries for "Steven Spielberg" are most often received from an "image" search page, the system may correlate queries for "Steven Spielberg" with image information; similarly, if queries for "Starbucks" are most often received from a "maps" search page, the system can correlate queries for "Starbucks" with location information.

As another example of a method by which a system can determine the category of information in which users are most interested, the system can track users' interactions with results that are provided in response to queries. In particular, the system may analyze user navigational input received following a user's receipt of search results to determine a category of information to which the user navigates. For example, when web information is provided (e.g., by default) to users in response to a query for "Steven Spielberg" (e.g., as shown in the screen shot 362), the system may determine that users most frequently select the control 338B to navigate to image information (e.g., as shown in the screen shot 359) before or instead of selecting any of the web results, or before selecting any other controls. Accordingly, the system may correlate queries for "Steven Spielberg" with image information. Similarly, the system may determine that when web information is provided (e.g., by default) to users in response to a query for "Starbucks," users most frequently select a control (e.g., control 338D) to navigate to map information (e.g., as shown in the screen shot 302). Accordingly, the system may correlate queries for "Starbucks" with map information.

Another user interaction that the system may analyze is time spent accessing various categories of information. In particular, the system may determine that users access map information, image information and news information in response to a query for "Starbucks," but that users spend the most time viewing and manipulating map information and relatively little time viewing or accessing image information. Accordingly, the system may correlate map information with queries for "Starbucks."

Based on various methods of determining a likely category of information that users are looking for in response to their specific queries, the system can, in some implementations, develop scores or rules for particular queries, or statistics over time corresponding to each distinct and periodically received query. A machine learning approach for forming correlations by analyzing logs of training data is discussed above. In addition, other statistical approaches may be performed, either in aggregated data apart from the actions of particular users, or also in combination with data about a particular user's actions in the form of a user profile. For example, over a 1-month period, the system may receive 12,606 queries for "Starbucks." Of these 12,606 queries, the system may determine that in 1,624 instances, (about 13% of the time) the user was looking for news information and in 7,154 instances, (about 57% of the time) the user was looking for map information. Based on this data (e.g., a "distribution"), the system could predict that users who submit queries for "Starbucks" are generally interested in news information. Thus, in some implementations, the system could present news information in response to queries for "Starbucks" and more often than not, this may be the information a specific user is seeking in response to a query for "Starbucks," if the 12,606 queries over the 1-month period are representative of all queries for "Starbucks."

Other information may be known about each (or some) of the 12,606 example queries for "Starbucks." For example, based on certain meta-information that may be received with a query itself, the system may be able to determine whether a specific query is received from a device that is relatively "mobile" or from a device that is deemed "non-mobile" (or classified as such for purposes of this example analysis). In particular, search queries that are received from wireless communication devices (e.g., cell phones or smartphones) may generally include meta information identifying certain wireless network providers (e.g., Verizon, Cingular, T-Mobile, etc.), whereas search queries that are received from, for example, non-mobile desktop computers may not include such meta information.

Because information about devices from which queries are received may be useful in predicting physical characteristics of the electronic device from which a specific query is received—which in turn may be useful for predicting the category of information a specific user is seeking—it may be advantageous for the system to maintain separate statistics (e.g., "sub-distributions") for specific queries based on whether the queries are received from an electronic device that is classified as a "mobile" device or from an electronic device that is classified as a "non-mobile" device. For example, users of mobile devices (e.g., smartphones or cell phones) who enter queries for "Starbucks" may generally be interested in finding map information, whereas users of non-mobile devices (e.g., desktop computers) who enter the same queries may generally be interested in finding web information. As another example, users of mobile devices who enter queries for "Steven Spielberg" may generally be interested in finding news information, whereas users of non-mobile devices who enter the same query may generally be interested in finding image information. Thus, by analyzing various query-related information associated with specific queries, the system can maintain certain statistics for the specific queries and can classify and categorize the statistics in many different ways, such as by the type of electronic device (e.g., "mobile" or "non-mobile") from which the queries are received. Two exemplary tables of query-specific statistics are presented below.

Table 1 illustrates example statistics for the queries "Starbucks" and "Steven Spielberg," when those queries are received from a device that the system classifies as "non-mobile." Table 2 illustrates example statistics for the same two queries, when those queries are received from a device that the system classifies as "mobile." The particular statistics may be indicative of non-statistical relationships analyzed by the system (such as in the machine learning example above), or of direct statistical analyses performed by the system.

TABLE 1

Exemplary distributions for queries received from "non-mobile" devices.

|  | Web Information | Image Information | News Information | Maps Information | Stocks Information |
|---|---|---|---|---|---|
| "Starbucks" | 32% | 13% | 24% | 19% | 12% |
| "Steven Spielberg" | 47% | 24% | 29% | 0% | 0% |

TABLE 2

Exemplary distributions for queries received from "mobile" devices.

|  | Web Information | Image Information | News Information | Maps Information | Stocks Information |
|---|---|---|---|---|---|
| "Starbucks" | 5% | 1% | 15% | 73% | 6% |
| "Steven Spielberg" | 21% | 17% | 62% | 0% | 0% |

In each table, the percentages represent determined or calculated distributions for a specific query relative to a specific category of information. For example, as depicted in Table 1, a query for "Starbucks" that is received from a "non-mobile" device, is determined to be associated with web information 32% of the time (i.e., 32% of the analyzed queries for "Starbucks" that were received from an electronic devices deemed to be "non-mobile" (e.g., devices for which no corresponding wireless network provider meta information was received) during a specific example period were determined to be targeted to web information (based, for example, on a search page from which the query was received, navigational actions of users following receipt of information provided in a response to the query or time spent by users in accessing various categories of information related to the query)). As another example, as depicted in Table 2, a query for "Starbucks" that is received from a "mobile" device is determined to be associated with map information 77% of the time. Tables 1 and 2 provide other example statistics for queries for "Steven Spielberg" received from "mobile" and "non-mobile" devices.

In some implementations, a system can use such distributions to enhance users' search experiences. For example, based on the example distributions shown in Tables 1 and 2, the system could associate a search query for "Starbucks" from a "mobile" device with map information, and a search query for "Steven Spielberg" from a "non-mobile" device with news information-possibly saving a large number of specific users the trouble of navigating from a default category of information (e.g., web information) to an intended category of information.

In the examples provided in Tables 1 and 2, the distributions of queries are fully characterized. That is, the percentages total 100% for each query. However, the reader will appreciate that the information depicted in Tables 1 and 2 would still be useful, even if only a fraction of the queries were characterized. For example, specific queries could be correlated to the category of information that was most often associated with the queries that were characterized, regardless of the actual percentages.

In some implementations, a system can predict the category of information a specific user is seeking based on a profile that the system maintains for that user. For example, using various techniques, some of which are described above, a system can determine a distribution of the categories of information a specific user generally accesses. In some implementations, such distributions can be determined independently of the content of the corresponding search queries. For example, with reference to Joe and Jane, the system may be able to determine that Joe generally accesses map information, whereas Jane generally accesses stock information. An example distribution that may be included in a profile that the system maintains (e.g., develops over time) for Joe and Jane is provided in Table 3, below.

TABLE 3

Exemplary profiles for two users

| | Web Information | Image Information | News Information | Maps Information | Stock Information |
|---|---|---|---|---|---|
| Joe (student; cell phone user) | 8% | 21% | 17% | 53% | 1% |
| Jane (stockbroker; smartphone user) | 1% | 3% | 26% | 19% | 51% |

In some implementations, a system can use profile-based distribution information such as that depicted in Table 3 to enhance users' search experiences. For example, based on the example distributions shown in Table 3, the system could associate all queries from Joe with map information and all queries from Jane with stock information-possibly saving both Joe and Jane the trouble, at least some of the time, of having to navigate from a default category of information (e.g., web information) to an intended category of information.

In some implementations, further advantages can be provided by a system that determines a category of information a specific user is likely seeking based both on global distribution information associated with the specific corresponding query and profile information associated with the user from whom the query is received. In some implementations, multiple categories of information are provided to the user in response to a search query, but the categories of information are ordered based on a determined likelihood that the user is looking for a specific category of information. One example method of using both global, query-based distribution information and user-profile information to order the categories of information to be provided to a user in response to a query is provided with reference to Equation 1, Tables 4-8 and FIGS. 4A and 4B.

One method of combining global, query-specific, distribution information and user-profile information is to calculate a likelihood that a specific user is searching for each possible category of information associated with the specific query, based on a weighted contribution of a global distribution for the specific query for "non-mobile" devices, a global distribution for the specific query for "mobile" devices, and a query-independent, profile-based distribution. For example, each time a user enters a search query, the system can retrieve the user's profile, if such a profile exists (e.g., a distribution of the categories of information the user generally reviews as depicted in Table 3) and the system can retrieve global query-specific profiles (if they are available) for "mobile" and "non-mobile" devices (e.g., query-specific profiles as depicted in Tables 1 and 2). Based on the retrieved profiles, the system can in some implementations, calculate a likelihood that the user is seeking a particular category of information based on calculations associated with each category of available information.

In one implementation, a calculated likelihood can be expressed as a function of the user, the query, and a series of weighting factors that can be used to adjust the relative impact of the user's profile and the query-specific "non-mobile" and "mobile" distributions. For example, the likelihood that a specific user (USER) is searching for a particular category of information (INFOTYPE) in response to a particular query (QUERY) can be calculated by the following:

$$\text{LIKELIHOOD}(\text{INFOTYPE}, \text{USER}, \text{QUERY}) = \text{WEIGHT}_{PROFILE} * \text{PROFILE}(\text{USER}, \text{INFOTYPE}) + \text{WEIGHT}_{NMDevice} * \text{NMD}_{IST}(\text{QUERY}, \text{INFOTYPE}) + \text{WEIGHT}_{MDevice} * \text{MD}_{IST}(\text{QUERY}, \text{INFOTYPE})$$

Equation 1:

The various expressions in Equation 1, according to one implementation, are described below:

| LIKELIHOOD(INFOTYPE, USER, QUERY) | An overall calculation representing, for example, a statistical likelihood that a query (QUERY) submitted by a user (USER) is directed to a particular category of information (INFOTYPE). Note that the "user can be a human user identifiable, for example, by a user account ID; or the "user" could be a specific electronic device, identifiable, for example, by a device ID. |
|---|---|

| | |
|---|---|
| PROFILE(USER, INFOTYPE) | A number included in a profile for a user (USER) that represents a frequency with which the user accesses a particular category of information. For example, in some implementations, PROFILE(JOE, WEBINFO) = 0.08 means that a profile for user Joe indicates that 8% of Joe's data accesses correspond to the category of information classified as "web information" (WEBINFO). |
| $WEIGHT_{PROFILE}$ | A number that represents the weighting factor for profile information. In this example, the weighting factor determines how much of an impact on the overall likelihood calculation profile information will have. |
| NMDIST(QUERY, INFOTYPE) | A number, included for example in a global query-based distribution, representing a frequency with which a query (QUERY) is globally correlated to a particular category of information (INFOTYPE) for devices that are classified as "non-mobile." Note that devices may be classified as "non-mobile" for purposes of this distribution, even though they may technically be portable devices. As an example, in some implementations, NMDIST("STARBUCKS", STOCKINFO) = 0.12 means that a query for "Starbucks" received from a device that is classified as "non-mobile" has a 12% chance of being directed to stock information (e.g., based on an analysis of a large number users processing information provided in response to queries for "Starbucks"). The "non-mobile device distribution" number may or may not be normalized (e.g., relative to other possible categories of information). In other words, in some implementations, the number is a percentage likelihood; in other implementations, the number provides only a relative (non-normalized) basis for comparison to other numbers. |
| $WEIGHT_{NM\_DEVICE}$ | A number that represents the weighting factor for "non-mobile" query-specific information. In some implementations, the weighting factor determines how much of an impact on the overall likelihood calculation "non-mobile" query-specific information will have. |
| MDIST(QUERY, INFOTYPE) | A number, included for example in a global query-based distribution, representing a frequency with which a query (QUERY) is globally correlated to a particular category of information (INFOTYPE) for devices that are classified as "mobile." Note that devices may be classified as "mobile" for purposes of this distribution, even though they may technically be devices that are difficult to transport. As an example, in some implementations, MDIST("STARBUCKS", IMAGEINFO) = 0.01 means that a query for "Starbucks" received from a device that is classified as "mobile" has a 1% chance of being directed to image information (e.g., based on an analysis of a large number users processing information provided in response to queries for "Starbucks"). The "mobile device distribution" number may or may not be normalized (e.g., relative to other possible categories of information). |
| $WEIGHT_{MDEVICE}$ | A number that represents the weighting factor for "mobile" query-specific information. In some implementations, the weighting factor determines how much of an impact on the overall likelihood calculation "mobile" query-specific information will have. |

In some implementations, the weighting factors can be global constants that are applied to each user and query. One set of possible weighting factors are provided in Table 4. As shown in Table 4, the user-profile weighting factor is 70%, indicating that the user profile contributes most significantly to the overall likelihood calculation, whereas the global "non-mobile" and "mobile" distributions each contribute less significantly to the overall likelihood calculation.

TABLE 4

Example weighting factors for determining a likely ranking of desired categories of information

| User profile | "Non-mobile" Device Distribution | "Mobile" device Distribution |
|---|---|---|
| 70% | 10% | 20% |

Other weighing factors and equations for calculating a likelihood value are possible. For example, in some implementations, only "non-mobile" query-specific distributions may be included in the likelihood calculation when the corresponding query is received from a device that is classified as 'non-mobile." As another example, profile information may not be available for each query received, and in such cases where profile information is not available, the corresponding likelihood calculation may be based solely on one or more of a "non-mobile" and "mobile" query-specific distribution information.

Distributions could also be maintained and classified in different ways. For example, separate distributions may be maintained for individual electronic devices (e.g., one distribution for Motorola RAZR™ cell phones, another for Palm Treo™ smartphones, another distribution for LG cell phones, etc.), and an appropriate distribution may be applied to specific likelihood calculations based on the type of device from which corresponding queries are received (e.g., in cases in which device type can be determined). As another example, distributions could be maintained and classified based on a time of day at which they are received, or on a geographic location from which they are received. The reader will appreciate that numerous other equations, methods, and distributions can be applied to the likelihood calculation without departing from the spirit and scope of this description.

Example likelihood calculations for correlating a specific query from a specific user to a particular category of information are further explained with reference to example numbers in Tables 5-8. Table 5 illustrates numerically how a likelihood calculation may be made—in a particular, a likelihood calculation relating to whether a particular user (Joe) is seeking each possible category of information (web information, image information, news information, map information, or stock information—in one example) in response to a search query ("Starbucks"). The numbers in Table 5 are calculated based on Equation 1 and the contents of Tables 1, 2, 3 and 4.

TABLE 5

Example Category-Query Calculations (e.g., for a "Starbucks" Query from Joe)

| | |
|---|---|
| WEB INFORMATION<br>LIKELIHOOD (WEBINFO, JOE, "STARBUCKS") =<br>$WEIGHT_{PROFILE}^1$ * PROFILE (JOE, WEBINFO)$^2$ +<br>$WEIGHT_{NMDEVICE}$ * NMDIST("STARBUCKS", WEBINFO)$^3$ +<br>$WEIGHT_{MDEVICE}$ * MDIST("STARBUCKS", WEBINFO)$^4$ =<br>(0.7) * (0.08) + (0.1) * (0.32) + (0.2) * (0.05) = 0.098<br>$^1$Example weighting constants taken from Table 4<br>$^2$Example profile number taken from Table 3.<br>$^3$Example "non-mobile" device distributions taken from Table 1.<br>$^4$Example "mobile" device distributions taken from Table 2. | 0.098 |
| IMAGE INFORMATION<br>LIKELIHOOD (IMAGEINFO, JOE, "STARBUCKS") =<br>$WEIGHT_{PROFILE}$ * PROFILE (JOE, IMAGEINFO) +<br>$WEIGHT_{NMDEVICE}$ * NMDIST("STARBUCKS", IMAGEINFO) +<br>$WEIGHT_{MDEVICE}$ * MDIST("STARBUCKS", IMAGEINFO) =<br>(0.7) *(0.21) + (0.1) *(0.13) + (0.2) *(0.01) = 0.162 | 0.162 |
| NEWS INFORMATION<br>LIKELIHOOD (NEWSINFO, JOE, "STARBUCKS") =<br>(0.7) * (0.17) + (0.1) * (0.24) + (0.2) * (0.15) = 0.173 | 0.173 |
| MAP INFORMATION<br>LIKELIHOOD (MAPINFO, JOE, "STARBUCKS") =<br>(0.7) * (0.53) + (0.1) * (0.19) + (0.2) * (0.73) = 0.536 | 0.536 |
| STOCK INFORMATION<br>LIKELIHOOD (STOCKINFO, JOE, "STARBUCKS") =<br>(0.7) * (0.01) + (0.1) * (0.12) + (0.2) * (0.06) = 0.031 | 0.031 |

As shown in one implementation in Table 5, a likelihood value of 0.098 corresponds to web information, a likelihood value of 0.162 corresponds to image information, likelihood value of 0.173 corresponds to news information, a likelihood value of 0.536 corresponds to map information, and a likelihood value of 0.031 corresponds to Stock Information. Using these calculated likelihood values, a system may determine that the categories of information that are most likely to be relevant to Joe, in response to a query for "Starbucks" are, in order of calculated relevance, map information, news information, image information, web information and stock information.

The system can use these calculated relevance values in providing categories of responsive information to the query for "Starbucks" associated with Joe. In particular, in some implementations, the system could present map information first, followed by news information, followed by image information, and so on. In other implementations, the system could provide a single category of information (e.g., the category of information calculated to be most relevant to a specific query) but provide a method by which the other information could be easily obtained. For example, in response to a query for "Starbucks" associated with Joe and received from a device classified as "mobile" (e.g., Joe's cell phone 115), the system (e.g., the information provider 103) could transmit a formatted response that includes only map information, as shown in FIG. 4A. In the implementation shown, the formatted response includes links to other categories of information, and these other categories of information can be ordered based on the corresponding calculated relevance between each category of information and the original query.

In particular, FIG. 4A illustrates a navigation bar 402 that may allow the user of cell phone 115 to navigate (e.g., scroll) from one category of information to another. For example, upon selection of a right navigation key (not shown) on the cell phone 115, the elements of the navigation bar 402 may scroll left, such that "news" is displayed as the left-most element, followed by "images," followed by "web" (not currently shown); and news information may be displayed in the display region 405 of the cell phone 115. As another example, a user may be able to navigate to another category of information by selecting a navigation control 408A, 408B or 408C included in the navigation bar 402. For example, by selecting the "images" control 408B (e.g., by manipulation of keys (not shown) in the cell phone 115, or by touching the displayed control element in the case of a touch-sensitive screen on the cell phone 115), information may be displayed in the display region 405, and the navigation bar 402 may be redrawn to show the "images" control 408B in the left-most position of the navigation bar 402.

In various implementations, the predictive presentation of information can significantly improve a user's experience. For example, by receiving, in response to his query for "Starbucks," the map information that is shown in FIG. 4A, Joe may avoid having to pre-select a desired category of information or to navigate from an undesired default category of information to the desired category of information. Even in cases in which system incorrectly predicts a user's desired category of information, the user may still be able to, on average, obtain the desired category of information faster than if the system had required a pre-selection of the desired category of information or had provided a default category of information in response to the user's query.

Additional aspects to an example system are illustrated and described with reference to Table 6 and FIG. 4B.

TABLE 6

Example Category-Query-Calculations (e.g., for a "Steven Spielberg" Query from Joe)

| | |
|---|---|
| WEB INFORMATION<br>LIKELIHOOD (WEBINFO, JOE, "STEVEN SPIELBERG") =<br>(0.7) * (0.08) + (0.1) * (0.47) + (0.2) * (0.21) = 0.145 | 0.145 |
| IMAGE INFORMATION<br>LIKELIHOOD (IMAGEINFO, JOE, "STEVEN SPIELBERG") =<br>(0.7) * (0.21) + (0.1) * (0.24) + (0.2) * (0.17) = 0.205 | 0.205 |
| NEWS INFORMATION<br>LIKELIHOOD (NEWSINFO, JOE, "STEVEN SPIELBERG") =<br>(0.7) * (0.17) + (0.1) * (0.29) + (0.2) * (0.62) = 0.272 | 0.272 |
| MAP INFORMATION<br>LIKELIHOOD (MAPINFO, JOE, "STEVEN SPIELBERG") =<br>(0.7) * (0.53) + (0.1) * (0.00) + (0.2) * (0.00) = 0.371 | 0.371<br>(0.000) |
| STOCK INFORMATION<br>LIKELIHOOD (STOCKINFO, JOE, "STEVEN SPIELBERG") =<br>(0.7) * (0.01) + (0.1) * (0.00) + (0.2) * (0.00) = 0.007 | 0.007<br>(0.000) |

As shown in Table 6, different likelihood values are shown for a query for "Steven Spielberg" associated with Joe. Table 6 illustrates special filtering that can be applied, in some implementations, to certain categories of information. For example, as shown in Tables 1, 2 and 6, the query for "Steven Spielberg" is not correlated with either map information or stock information. However, applying example Equation 1 to the profile and distribution numbers in Tables 1 and 2 results in non-zero likelihood values for both map and stock information, even though neither map nor stock information may be correlated with "Steven Spielberg" (at least for purposes of this example).

Accordingly, certain likelihood values for certain categories of information may be overridden if they are not likely to predict a meaningful correlation between a specific user and query and a particular category of information. For example, in some implementations, a calculated likelihood value may be reset to zero if any of the underlying values from which it was calculated are below a certain threshold. The resetting of likelihood values is depicted by the parenthetical zero values for map information and stock information in Table 6. In a case where calculated values are overridden, as shown, the system may order the categories of information in response to Joe's query for "Steven Spielberg" as follows: news information, image information and web information. Had the values not been overridden, the system may have ordered map information first, even though no map information may be correlated with "Steven Spielberg." FIG. 4B illustrates one example of how various categories of information can be presented (e.g., in an order based on calculated relevance values) in response to a query for "Steven Spielberg" associated with Joe (Joe's cell phone 115).

Figure 4D:
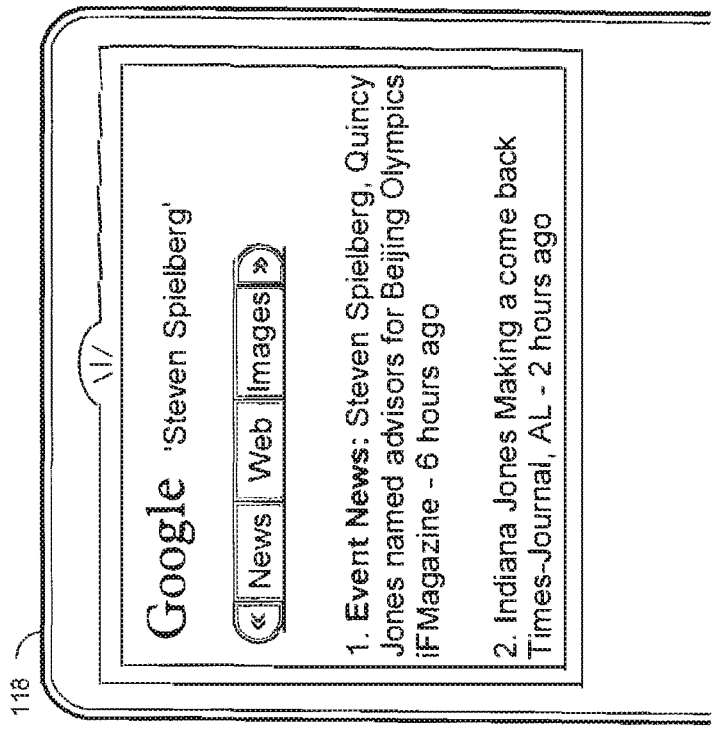
Figure 4C:
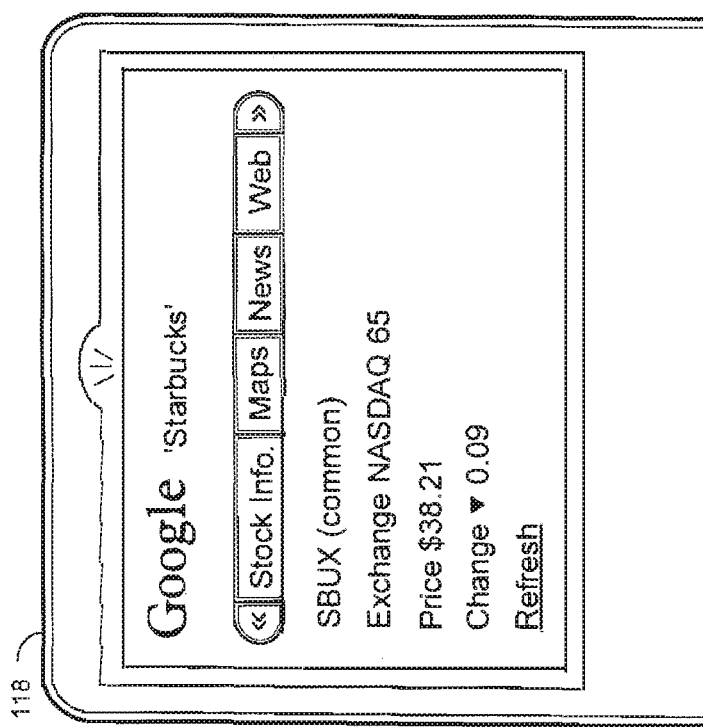

Tables 7 and 8 and corresponding FIGS. 4C and 4D illustrate examples of how categories of information may be ranked based on a calculated relevance and presented for display in a smart phone 118 in response to similarly queries ("Starbucks" and "Steven Spielberg") received from a different user.

TABLE 7

Example Category-Query-Calculations (e.g., for a "Starbucks" Query from Jane)

| | |
|---|---|
| WEB INFORMATION<br>LIKELIHOOD (WEBINFO, JANE, "STARBUCKS") =<br>(0.7) * (0.01) + (0.1) * (0.32) + (0.2) * (0.05) = 0.049 | 0.049 |
| IMAGE INFORMATION<br>LIKELIHOOD (IMAGEINFO, JANE, "STARBUCKS") =<br>(0.7) * (0.03) + (0.1) * (0.13) + (0.2) * (0.01) = 0.036 | 0.036 |
| NEWS INFORMATION<br>LIKELIHOOD (NEWSINFO, JANE, "STARBUCKS") =<br>(0.7) * (0.26) + (0.1) * (0.24) + (0.2) * (0.15) = 0.236 | 0.236 |
| MAP INFORMATION<br>LIKELIHOOD (MAPINFO, JANE, "STARBUCKS") =<br>(6.7) * (0.19) + (0.1) * (0.19) + (0.2) * (0.73) = 0.298 | 0.298 |
| STOCK INFORMATION<br>LIKELIHOOD (STOCKINFO, JANE, "STARBUCKS") =<br>(0.7) * (0.51) + (0.1) * (0.12) + (0.2) * (0.06) = 0.381 | 0.381 |

TABLE 8

Example Category-Query-Calculations (e.g., for a "Steven Spielberg" Query from Jane)

| | |
|---|---|
| WEB INFORMATION<br>LIKELIHOOD (WEBINFO, JANE, "STEVEN SPIELBERG") =<br>(0.7) * (0.01) + (0.1) * (0.47) + (0.2) * (0.21) = 0.096 | 0.096 |
| IMAGE INFORMATION<br>LIKELIHOOD (IMAGEINFO, JANE, "STEVEN SPIELBERG") =<br>(0.7) * (0.03) + (0.1) * (0.24) + (0.2) * (0.17) = 0.079 | 0.079 |

TABLE 8-continued

Example Category-Query-Calculations (e.g., for a "Steven Spielberg" Query from Jane)

| | | |
|---|---|---|
| NEWS INFORMATION<br>LIKELIHOOD (NEWSINFO, JANE, "STEVEN SPIELBERG") =<br>(0.7) * (0.26) + (0.1) * (0.29) + (0.2) * (0.62) = 0.335 | 0.335 | |
| MAP INFORMATION<br>LIKELIHOOD (MAPINFO, JANE, "STEVEN SPIELBERG") =<br>(0.7) * (0.19) + (0.1) * (0.00) + (0.2) * (0.00) = 0.133 | 0.133 | (0.000) |
| STOCK INFORMATION<br>LIKELIHOOD (STOCKINFO, JANE, "STEVEN SPIELBERG") =<br>(0.7) * (0.51) + (0.1) * (0.00) + (0.2) * (0.00) = 0.357 | 0.357 | (0.600) |

Taken together, the Tables 5-8 and corresponding FIGS. 4A-4D illustrate examples of how categories of information can be predicatively ordered based on one or more calculations related to a user profile associated with a specific query (e.g., compare FIGS. 4A and 4C or 4B and 4D) and calculations related to statistics about the query itself (e.g., compare FIGS. 4A and 4B or 4C and 4D). As mentioned above, such predictive ordering can, in some implementations, enhance a user's experience with receiving information that is responsive to a query.

Figure 5:
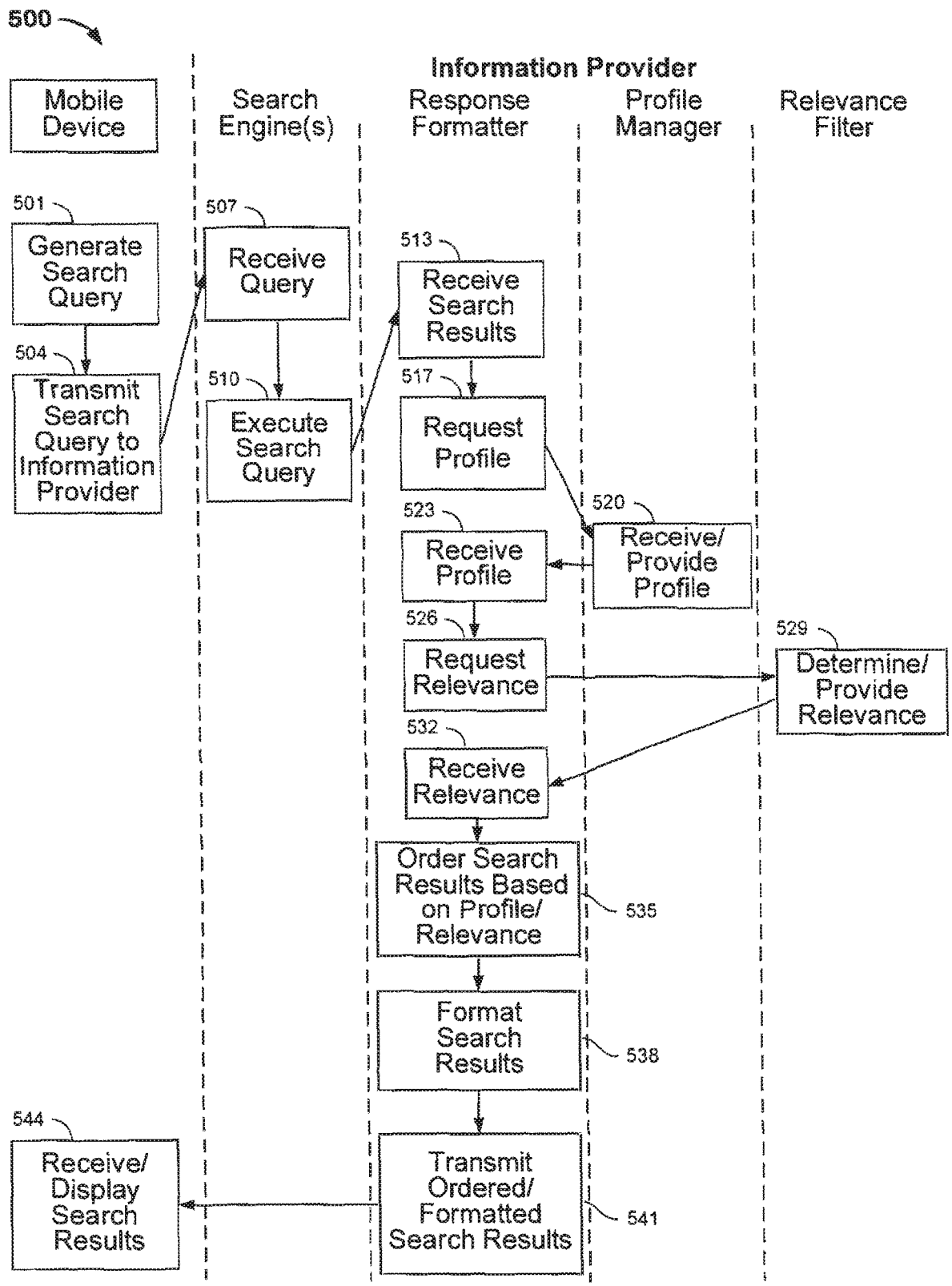
FIG. 5 is a flow diagram of an example process, by which a user can initiate a search query and receive in response ordered categories of information.

FIG. 5 is a flow diagram illustrating an example process 500 by which a user of an electronic device (e.g., a cell phone or smart phone) can generate a search query, transmit the search query to an information provide, and in response, receive search results that include different categories of information that are ordered based on a predicted category of information for which the user may be searching. For clarity, the example actions in the process 500 are depicted as occurring at a mobile device, one or more search engines, a response formatter, a profile manager and a relevance filter, but the reader will appreciate that the actions or similar actions could also be carried out by fewer devices or sites or with a different arrangement of devices or sites.

As shown, a user of an electronic device (e.g., a mobile device) can generate (501) a search query and transmit (504) the search query to an information provider. For example, referring to FIG. 1, a user of the cell phone 115 can generate (501) a search query and direct that query to the information provider 103. Physically, the cell phone 115 can transmit the query via the wireless network 124 and the network 121 (e.g., the internet) to the information provider 103 (via parts A and B).

The information provider can receive (507) the query (e.g., in particular, for example, a search engine within the information provider can receive the query). Once received, the search query can be executed (520) by the search engine. For example, referring to FIG. 2, the information provider 102 can receive (507) the search query via the interface 222, and the request processor 225 can reformat the search query, if necessary, and transmit the (reformatted) search query to the search engine 201, which can execute (510) the search query. Executing (510) the search query can including searching various indexes, such as the web index 204, the maps index 207, the news index 210, etc., for content that corresponds to contents of the search query. In some implementations, the search engine 201 executes the search query against each indexed category of information in order to identify all possible categories of information that may be relevant to the search query.

A response formatter can receive (513) the search results. For example, after the search engine 201 executes (510) the search query against each possible index to identify multiple sets of results, each result including a different category of information (e.g., web information, maps information, news information, etc.), the search engine 201 can forward the results to the response formatter 228. The response formatter can determine an appropriate order for the different categories of search results (i.e., the response formatter can determine whether to present the search results to the mobile device in, for example, a web-image-news order, a map-news-image order, a news-web-images, etc.).

To determine the order in which different categories of information are presented to the electronic device, the response formatter can, in some implementations, employ a combination of user profile data and global distribution data associated with a specific query. To do so, the response formatter can request (517) a profile corresponding to the electronic device from which the query was received, or a user associated with that device.

A profile manager can retrieve (520) and provide (520) the profile in response to the response formatter requesting (517) the profile, and the response formatter can receive (523) the profile. For example, with reference to FIG. 2, the response formatter 228 can send a request for specific profile information to the profile manager 231, which can retrieve (520) the appropriate profile from, for example, the profile database 234. In some implementations, information about the electronic device from which the query is received or about a user of the electronic device is included in the query itself. For example, the query may include a device identifier corresponding to the electronic device or a user identifier (e.g., a user login or account identifier) corresponding to a user of the electronic device; in such cases, the request processor 225 can extract this information from the query and provide it to the response formatter 228 for use in identifying and obtaining an appropriate profile.

The response formatter can also request (526) relevance information from a relevance filter. The relevance filter can determine (529) and provide (529) the relevance information corresponding to a specific query to the response formatter, which, in turn, can receive (532) the relevance information. For example, with reference to FIG. 2, the response formatter 228 can request relevance information from the relevance filter 237 corresponding to the specific query. In some implementations, as is described above, relevance information can include a likelihood that the search query is associated with each category of information (e.g., as depicted by Tables 1 and 2).

Based on the profile information and/or relevance information, the response formatter can order (535) the search results, based on, for example, a calculated likelihood that the query is directed to a particular category of information. For example, the response formatter can, in some implementations, calculate a likelihood (e.g., using a method similar to that described above with reference to Equation 1 and Table 3-8) that the received query is directed to each category of information, and each result set can be ordered (535) based on the category of information to which the result set corresponds and the likelihood that the category of information is the category to which the query was directed.

In addition, the ordering of the results may also be based on the quality of the actual results. Specifically, even if a query is determined to be a good query for a particular group or corpus of information, the result may not be shown or may be demoted if the result is bad. The quality of the result may be determined, for example, by the number of relevant documents found it a corpus, by scores of the identified documents as determined by a search engine scoring system, by the similarity of the identified documents to each other, or by other appropriate mechanisms.

Each result set can also be formatted (538) as necessary, transmitted (541) to the electronic device from which the query was received, and that electronic device can receive (544) the results set and display the result sets to a user of the electronic device. For example, upon completion of the ordering (535) and formatting (538) processes, the response formatter 228 can transmit (541) the ordered, formatted result sets to the mobile device 115 via the interface 222, network 121 (see FIG. 1) and wireless network 124 (e.g., via paths E and F). In some implementations, the results are displayed in the mobile device 115 as shown in FIGS. 4A and 4B.

Figure 6:
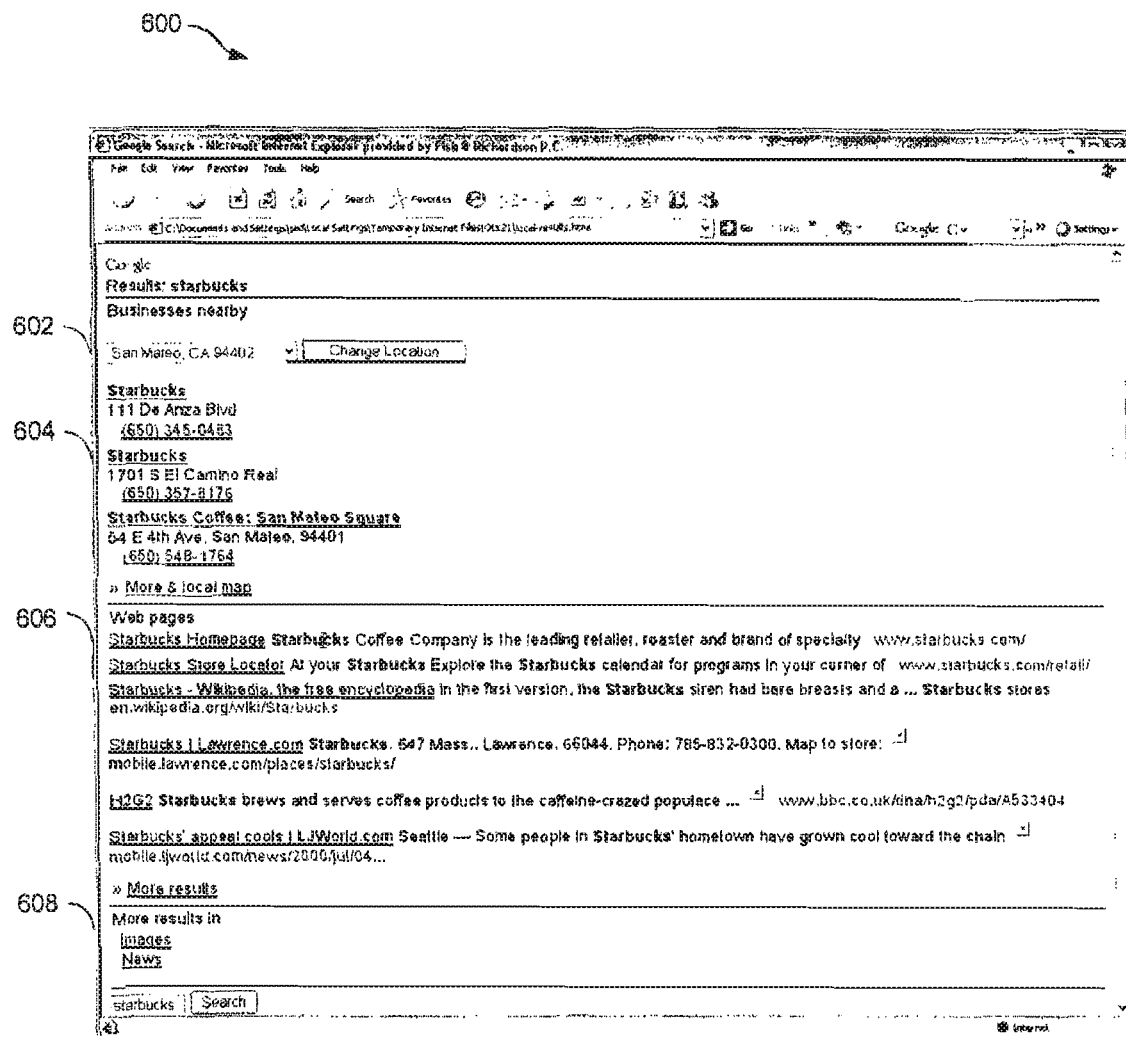
FIG. 6 is a screen shot showing an exemplary local one box.

FIG. 6 is a screen shot 600 showing an exemplary local one box. The screen shot 600 shows a display on a large device like a desktop computer, but the one box could also be displayed in a more compact manner on the mobile device display. Where mobile devices are involved, so-called "local" search results may be particularly relevant to users. Local results are results drawn to a particular geographic area, such as restaurants or other stores in an area, or to parameters such as weather, sports scores, and certain (local) news. Because people tend to search for restaurants, look at the news, or comparison shop on prices while using mobile devices (and tend to conduct research and other more involved activities at home computers), such local search results often come up when searches are presented on mobile devices.

Screen shot 600 shows one exemplary manner in which certain local results may be displayed. The results here are results generated for a search on "Starbucks." The search engine has recognized that search query as involving a local search and has generated a local one box, along with other related information responsive to the search. Location area 602 indicates to the user that the search has been interpreted as being local-related, and provides a user with the opportunity to enter a different area, such as by state, municipality, or zip or area code. If the user enters such an area, then the default location for the user's device may be changed to that area.

One box area 604 shows multiple formatted local results for the search query—in this case, contact information for particular Starbucks stores. The information has been extracted from other sources, such as web pages, and particularly relevant information is shown in one box area 604. Other formats for a one box, which takes from one or more articles particular information that is likely to be highly relevant, and formats portions of that material from the articles into a more readable form, may also be used. As explained elsewhere, for example, a weather one box may format current temperature and future high-low temperature information into a single graphic.

Web results area 606 may display search results in a more traditional manner, with a link to a particular article, a snippet from the article, and a URL for the article. The web results may be selected in various manners. Additional groups area 608 allows a user to identify other corpuses or groups that can be displayed. For example, an "images" link, if selected, can cause the display of a number of thumbnails relating to the term "Starbucks," such as photos of a coffee cup, a Starbucks outlet, or pictures of Starbucks management. Such other groups can be displayed in case the decision to first display a local one box to a user was wrong, or because the user browses the local search results, and then decides to look in other groups.

Figure 7A:
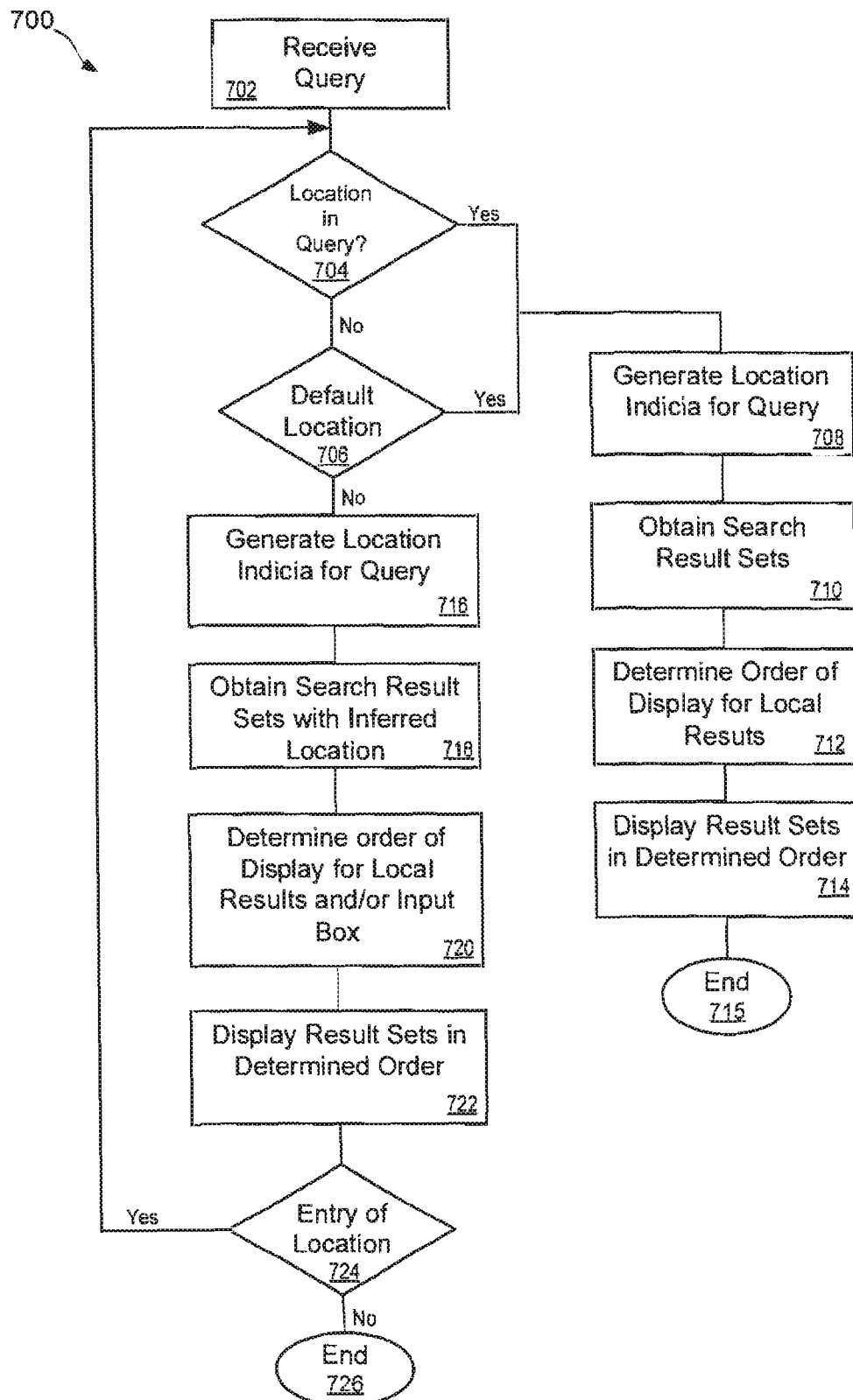
FIG. 7A is a flow chart of a process for identifying the applicability of local search results to a query.

FIG. 7A is a flow chart of a process 700 for identifying the applicability of local search results to a query. In general, the process involves determining whether a particular query entered by a user is likely or unlikely to be directed to "local" search results. For example, terms or queries such as "restaurant," "weather," "movie," "directions," and "McDonalds" may be highly correlated with local search requests. In contrast, terms or queries like "Google," "David Hasselhoff," "podcast," or "Monty Python" would not.

In this manner, local search results may be considered unique among the various formats of results that might be displayed to a user in search result groups. In addition, proper placement of local results may be particularly important for queries explicitly identified as local or queries that come from mobile devices (as determined, e.g., by an IP address in the header of the message sending the query), because local search is so highly correlated with the needs of such users.

The process 700 shows an exemplary approach for determining whether a particular search query is likely to be directed to a local search or not, and to display the search results accordingly. At box 702, a query is received, and may take any appropriate form for a query. At box 704, the process determines whether the query contains a location indicator. Location indicators may include, for example, 5-digit or 9-digit numbers that match a zip code, a 3-digit number that matches an area code (and does not match up with surrounding terms in the query), the name of a town or state, or the abbreviation of a state (CA, MN, Cal, Calif, Minn, etc.), the letters for an airport (e.g., MSP, SFO, etc.), and well-known venue names (e.g., The Forum, Wrigley, Shea Stadium, etc.).

Certain explicit location identifiers may be less-strongly correlated with a user's desire to see local search results than are others. For example, a zip code may be highly correlated, as may a combination of a city name and state abbreviation (and especially when also accompanied by a zip code). In contrast, a search for a venue name might only show an interest in non-local information relating to the venue (e.g., the name of the architect or general contractor for a stadium) or for information relating to a term in the name of the venue (e.g., a desire for information about the politician Hubert Humphrey rather than local results surrounding the Hubert H. Humphrey Metrodome). In such situations where the explicit location identifier may be considered weak, the default location that has previously been associated with a device of a user account may be used instead. Also, if the quality of results generated using the explicit identifier is low (e.g., there are not many results, or the results are highly dissimilar to each other), the default location may be used.

If such an explicit identifier is found in the query, the process may assume that the user wants to conduct a search for that area. The process may then generate a location indicia for the query (708). The location indicia is a indicator of how closely correlated the query is to local search results. The indicia may, for example, have multiple discrete values, may have a more continuous range of values, or may be determined according to the firing or non-firing of a number of rules.

Figure 7B:
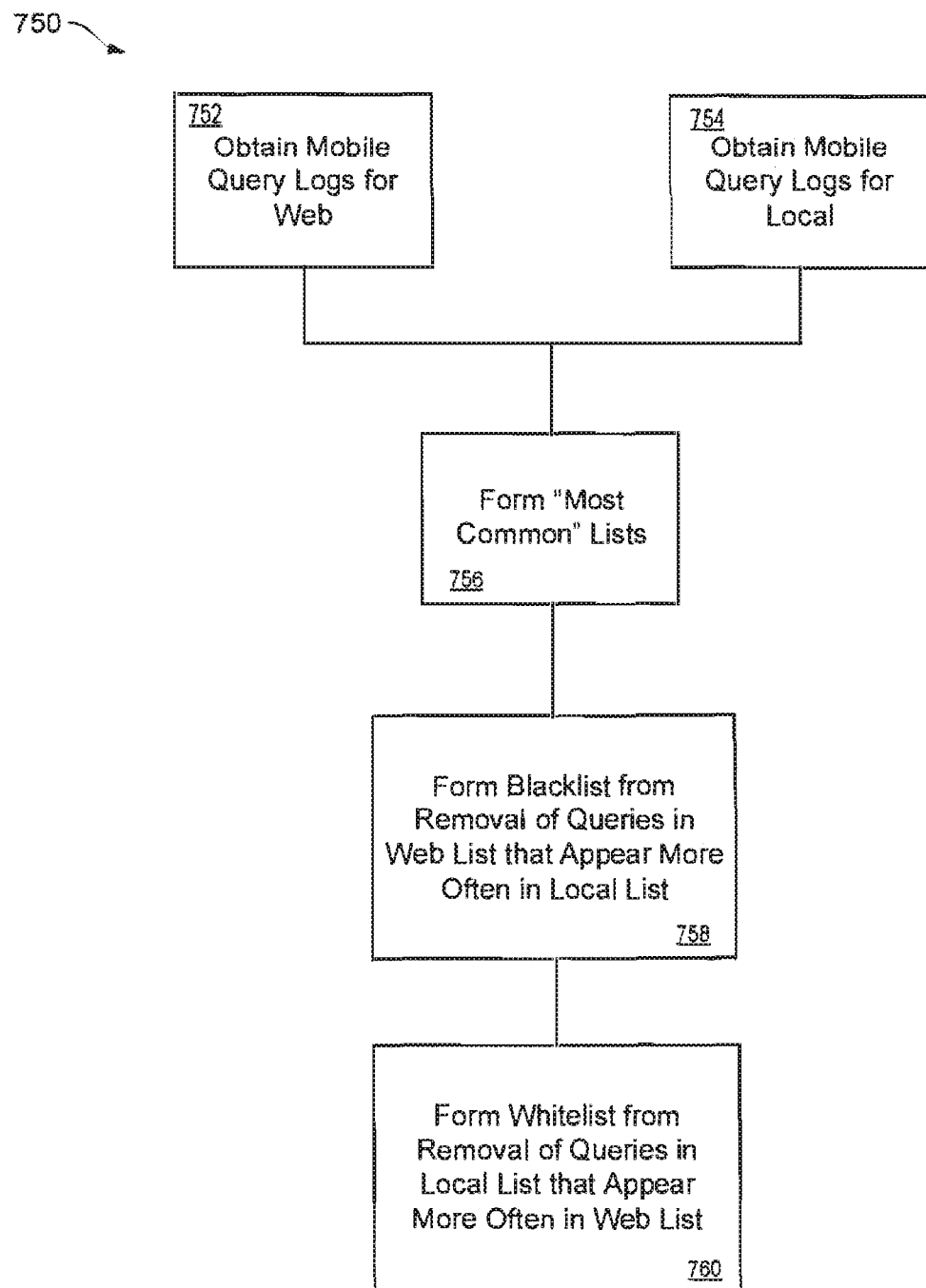
FIG. 7B is a flowchart of an example process for preparing a whitelist and blacklist.

One exemplary implementation using three discrete values may involve the use of a white list and a black list, whose preparation is described in more detail with respect to FIG. 7B. The white list contains queries or portions of queries that are highly correlated with local search, while the black list contains queries of portions of queries that have a low correlation with local search.

As shown by process 750 in FIG. 7B, the lists may be prepared by first locating historical search data. The data may be gathered from two sources: (1) logs of searches for ordinary web data (box 752); and (2) logs of queries for "local" data (box 752), as determined, for example, by the fact that the queries were received with IP addresses associated with mobile data networks and/or were received when a "local" control was selected on a user's search application. Both categories of data may also have been associated with mobile devices, with the distinction made based on the corpus (web or local) to which the user directed the query.

At box 756, the process forms "most common" lists, for example, the 10,000 most common search queries for each collected group of data. These lists may be considered to represent the sorts of topics that people interested in non-local web search are most interested in, and those that people interested in local web search are most interested in. (The techniques here can be expanded to categories other than local and web also.) At step 758, a blacklist of queries or terms that should not be considered to be local-related is formed by taking the web "most common" list for web searches, and removing those entries that also appear in the local "most common" list. By this process, the black list will not contain any query that is frequently used by local searchers.

The reciprocal process may be conducted with respect to forming a white list. In particular, the local "most common" list may have its entries deleted that appear on the web most common list. In this manner, any terms that users relatively frequently associated with something other than local search will be eliminated from being identified as highly local.

Returning to FIG. 7A, the white list and black list may be used to generate a location indicia for the query (box 708). For example, if the query is on the blacklist, the indicia may be a low or negative value, while if it is on the white list, the indicia may be a high or positive value, and if it is on neither list, the indicia may be zero or null.

Other techniques may also be used to generate the local indicia. For example, scores or rules for identifying a particular query (whether a full query or one or more portions of a query) may be generated through the use of a machine learning system in a manner like that described above. In particular, such a system may be trained with data identified as local and non-local, and may generate a set of rules for identifying future queries as being local or non-local. Such approaches may be implemented using, for example, relevance filter 237 shown in FIG. 2.

The process may also obtain search result sets for various groups (e.g., web, local, maps, video, images, etc.) (box 710), and may then use the generated local indicia to determine a placement of the local results relative to other groups of results. Also, the indicia may be used to determine whether to display the local results as a one box (e.g., if the query is very highly correlated with local results), or as a list of discrete results. In one example, the indicia may be used to place the local results in front of other categories of results if the indicia is sufficiently high (e.g., the query is on a whitelist, the query has a high local score, or rules generated by a system indicate a high local correlation). Finally, the results may be presented in the determined order (box 714), and the process may end (box 715) and wait for further input from the user. Where an explicit location indicator (e.g., zip code) is included in a query, the corresponding local results may be automatically promoted to the "top" group of results regardless of the presence or absence of the rest of the query on a whitelist or blacklist, or regardless of whether the rest of the query is deemed to be local or not. Where no explicit location indicator is included, the various mechanisms for assigning an indicia may be employed, and such approaches may be used to determine the appropriate location of a local result group or groups among other groups of results.

If there is no identifiable location in the query (box 704), the process may determine whether a default location has been associated with the remote device or user (box 706). For example, when a person first uses a mobile device or application, they may have no location associated with them. But when they conduct a search that includes a location or they otherwise enter a location into the application, that location may be stored (either at the remote device or at a central server) and used as a "default" location for subsequent local searches. Thus, for example, when initially using a new telephone, a user may enter their home zip code. If they then enter a query like "movie schedule," the results for the local search may be centered around their local zip code.

If a default location can be determined (box 706), then the process may proceed to identify and order search results as described above (boxes 708-715). If there is not a default location and there is no location in the query itself, the user may be prompted for a location, and the operations of boxes 708-715 may be run.

However, such prompting may be distracting to the user, particularly if the user is not interested in a local search. As a result, the process 700 may generate search results and display them to the user (including in an order for groups determined by the groups' relevance to the query, as described above). Depending on how correlated the query is to local searches or results, the system may also then prompt the user to enter location information if they would like. To do so, the exemplary process 700 shows the generation of location indicia for the query (box 716), which may occur in the various manners expressed above.

The value of the location indicia may control the manner in which a follow up request for local information is put to the user. For example, if the query is determined to be highly correlated to location, the request may be placed above any search results in a prominent position so that the user (who presumably wants good local results) can quickly see that they have the option of entering location information, and can quickly get local results. If the correlation is low, on the other hand, the follow up request might not be shown at all, or it may be placed in a position of less prominence, so as to avoid distracting a user who presumably is not interested in local results.

The process 700 then generates a location indicia for the query (box 716) and also obtains search result sets for the query (box 718). Any local results may include an inferred location for the query, such as by estimating the remote device's location using techniques to determine an approximate location of a wireless network end node, among other techniques. The order of display of the local results relative to other results may then be determined using the indicia, as may the location of a follow up request control that allows a user to enter location information. For example, where the query is highly correlated with local results, the control may include a text entry box on the front tab of the displayed results and/or at the top of the displayed results. With the order of the results determined, the results may be displayed according to that order (box 722). Such display may occur by a transmission of the results from a central server to the remote device in a communication formatted to display the results in the particular order (and additionally, for example, in a ordered tab format discussed above), followed by the display on the remote device.

When a follow up request is displayed for a user to explicitly enter a location identifier, the process may then (box 724) repeat all of some of the search submissions using the entered information (ending at box 726). For example, the search may be resubmitted as a search containing explicit location information, or as coming from a device having a new default location. Alternatively, just the local portion of the search may be repeated, and the identification of the relevance of local information to the query may, in appropriate circumstances, also be repeated. The display of results may then be updated to show the new local results, and potentially to update the positioning of the various search result groups.

Figure 8:
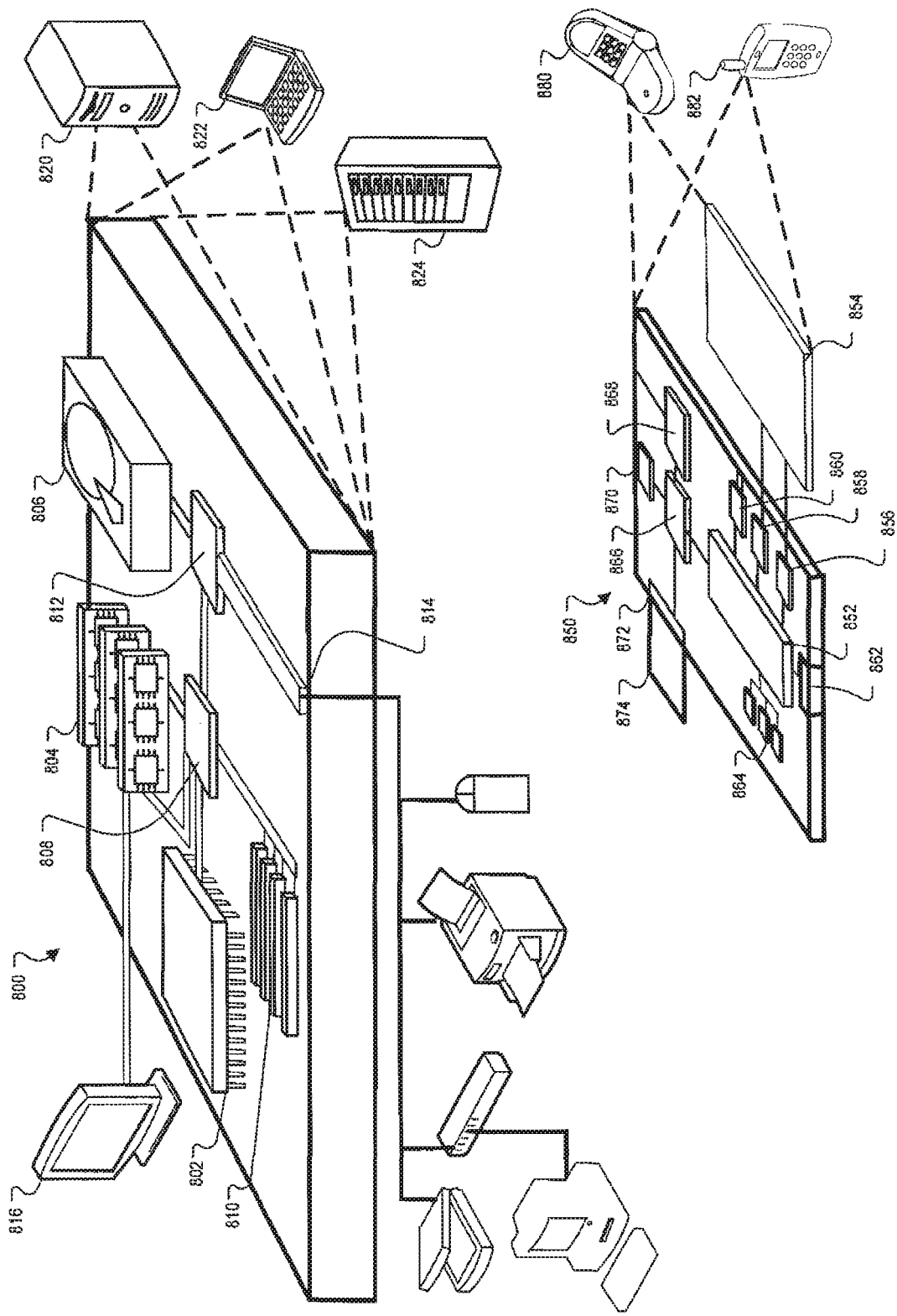
FIG. 8 is a block diagram of computing devices that can be used to implement the systems and methods described herein.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or a propagated signal.

The high-speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other categories of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Embodiments may be implemented, at least in part, in hardware or software or in any combination thereof. Hardware may include, for example, analog, digital or mixed-signal circuitry, including discrete components, integrated circuits (ICs), or application-specific ICs (ASICs). Embodiments may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing embodiments described herein.

A number of implementations have been described. Nevertheless, it will be understood that various modifications may be made without departing from the spirit and scope of this disclosure. Accordingly, other implementations are within the scope of the claims.

What is claimed is:

1. A computer-implemented method, comprising:
receiving a search query at a computing device;
submitting, by the computing device, the search query to a search system;
receiving, by the computing device and from the search system, a plurality of search result sets determined in response to the search query, wherein a first search result set and a second search result set of the plurality of search result sets relate to different categories of information; and
presenting the plurality of search result sets in a user interface on a display screen of the computing device, including rendering in the user interface the first search result set in a first vertically aligned module and the second search result set in a second vertically aligned module below the first vertically aligned module.

2. The computer-implemented method of claim 1, wherein the first search result set relates to a first category of information and the second search result set relates to a second category of information, wherein the second vertically aligned module is presented below the first vertically aligned module based on information indicating that the second category of information is less relevant than the first category of information to the search query or to a user of the computing device.

3. The computer-implemented method of claim 1, further comprising:
receiving, by the computing device, a selection of an element in the first vertically aligned module for the first search result set; and
in response to receiving the selection of the element, vertically expanding the first vertically aligned module to show additional information related to the first search result set.

4. The computer-implemented method of claim 3, further comprising:
receiving, by the computing device, a second selection of an element in the first vertically aligned module while the first vertically aligned module is expanded; and
in response to receiving the selection of the second element, collapsing the first vertically aligned module to show less information.

5. The computer-implemented method of claim 1, further comprising rendering, in the user interface, a plurality of information cards that present information from the plurality of search result sets, wherein the plurality of information cards are horizontally scrollable in the user interface.

6. The computer-implemented method of claim 5, wherein each card in the plurality of information cards presents a different category of search results.

7. The computer-implemented method of claim 1, wherein the first and second search result sets correspond to categories of information selected from a group of categories comprising web, news, maps, and images.

8. The computer-implemented method of claim 1, wherein the computing device is a mobile device.

9. A non-transitory computer-readable medium storing instructions that, when executed by a processor, cause performance of operations comprising:
receiving a search query at a computing device;
submitting, by the computing device, the search query to a search system;
receiving, by the computing device and from the search system, a plurality of search result sets determined in response to the search query, wherein a first search result set and a second search result set of the plurality of search result sets relate to different categories of information; and presenting the plurality of search result sets in a user interface on a display screen of the computing device, including rendering in the user interface the first search result set in a first vertically aligned module and the second search result set in a second vertically aligned module below the first vertically aligned module.

10. The computer-readable medium of claim 9, wherein the first search result set relates to a first category of information and the second search result set relates to a second category of information, wherein the second vertically aligned module is presented below the first vertically aligned module based on information indicating that the second category of information is less relevant than the first category of information to the search query or to a user of the computing device.

11. The computer-readable medium of claim 9, wherein the operations further comprise:

receiving, by the computing device, a selection of an element in the first vertically aligned module for the first search result set; and in response to receiving the selection of the element, vertically expanding the first vertically aligned module to show additional information related to the first search result set.

12. The computer-readable medium of claim 11, wherein the operations further comprise:

receiving, by the computing device, a second selection of an element in the first vertically aligned module while the first vertically aligned module is expanded; and in response to receiving the selection of the second element, collapsing the first vertically aligned module to show less information.

13. The computer-readable medium of claim 12, wherein the operations further comprise rendering, in the user interface, a plurality of information cards that present information from the plurality of search result sets, wherein the plurality of information cards are horizontally scrollable in the user interface.

14. The computer-readable medium of claim 13, wherein each card in the plurality of information cards presents a different category of search results.

15. The computer-readable medium of claim 9, wherein the first and second search result sets correspond to categories of information selected from a group of categories comprising web, news, maps, and images.

16. The computer-readable medium of claim 9, wherein the computing device is a mobile device.

17. A computing device, comprising:

a processor; and a computer-readable medium having instructions stored thereon that, when executed by the processor, cause the processor to perform operations comprising:

receiving a search query at the computing device;

submitting, by the computing device, the search query to a search system;

receiving, by the computing device and from the search system, a plurality of search result sets determined in response to the search query, wherein a first search result set and a second search result set of the plurality of search result sets relate to different categories of information; and presenting the plurality of search result sets in a user interface on a display screen of the computing device, including rendering in the user interface the first search result set in a first vertically aligned module and the second search result set in a second vertically aligned module below the first vertically aligned module.

18. The computing device of claim 17, wherein the first search result set relates to a first category of information and the second search result set relates to a second category of information, wherein the second vertically aligned module is presented below the first vertically aligned module based on information indicating that the second category of information is less relevant than the first category of information to the search query or to a user of the computing device.

19. The computing device of claim 17, wherein the operations further comprise:

receiving, by the computing device, a selection of an element in the first vertically aligned module for the first search result set; and in response to receiving the selection of the element, vertically expanding the first vertically aligned module to show additional information related to the first search result set.

20. The computing device of claim 19, wherein the operations further comprise:

receiving, by the computing device, a second selection of an element in the first vertically aligned module while the first vertically aligned module is expanded; and in response to receiving the selection of the second element, collapsing the first vertically aligned module to show less information.

* * * * *